United States Patent
Dudar

(10) Patent No.: US 10,480,439 B2
(45) Date of Patent: *Nov. 19, 2019

(54) SYSTEM AND METHOD FOR MITIGATING WET-FOULING OF SPARK PLUGS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 88 days.

This patent is subject to a terminal disclaimer.

(21) Appl. No.: 15/809,017

(22) Filed: Nov. 10, 2017

(65) Prior Publication Data

US 2019/0145331 A1 May 16, 2019

(51) Int. Cl.
| | |
|---|---|
| F02D 41/06 | (2006.01) |
| F02M 25/08 | (2006.01) |
| F02D 41/00 | (2006.01) |
| F02D 13/02 | (2006.01) |
| F02B 39/10 | (2006.01) |
| F02D 41/04 | (2006.01) |

(52) U.S. Cl.
CPC ............ *F02D 41/064* (2013.01); *F02B 39/10* (2013.01); *F02D 13/0207* (2013.01); *F02D 13/0261* (2013.01); *F02D 41/0002* (2013.01); *F02D 41/0007* (2013.01); *F02D 41/0035* (2013.01); *F02D 41/042* (2013.01); *F02M 25/0854* (2013.01); *F02D 41/062* (2013.01); *F02D 2041/001* (2013.01); *F02D 2041/002* (2013.01)

(58) Field of Classification Search
CPC ............... F02D 41/064; F02D 41/0002; F02D 13/0207; F02D 13/0261; F02D 2041/002; F02B 39/10; F02M 25/0854
USPC ....... 123/491, 399, 90.15, 520, 406.53, 543, 123/557; 701/103, 112, 113
See application file for complete search history.

(56) References Cited

U.S. PATENT DOCUMENTS

| | | | |
|---|---|---|---|
| 7,523,744 B2 | 4/2009 | Ayame | |
| 8,150,604 B2 * | 4/2012 | Ma | F02D 37/02 701/111 |
| 9,267,423 B2 | 2/2016 | Russ et al. | |
| 9,790,874 B2 | 10/2017 | Dudar | |
| 2005/0022776 A1 * | 2/2005 | Montgomery | F02D 41/008 123/295 |

* cited by examiner

*Primary Examiner* — Hai H Huynh
(74) *Attorney, Agent, or Firm* — Geoffrey Brumbaugh; McCoy Russell LLP

(57) ABSTRACT

Methods and systems are provided for mitigating spark plug wet-fouling in an engine system. In one example, a method may include, after spark plug wet-fouling has been detected prior to an engine start, selecting between drying one or more of the wet-fouled spark plugs by routing a heated gas through one or more engine cylinders and by routing a compressed gas through the one or more engine cylinders. In this way, on-demand airflow may be provided to expedite spark plug drying.

20 Claims, 9 Drawing Sheets

SYSTEM AND METHOD FOR MITIGATING WET-FOULING OF SPARK PLUGS

FIELD

The present description relates generally to methods and systems for drying wet-fouled spark plugs of an engine.

BACKGROUND/SUMMARY

Engine ignition systems may include a spark plug for delivering an electric current to a combustion chamber of a spark-ignited engine, such as a gasoline engine, to ignite an air-fuel mixture and initiate combustion. Spark plug fouling may occur wherein a firing tip of the spark plug insulator becomes coated with a foreign substance, such as fuel or soot. Soot-fouled spark plugs include a carbon build-up on an electrode of the spark plug, whereas wet-fouled spark plugs include liquid fuel build-up around the electrode. Spark plugs may become wet-fouled due to engine flooding, for example. The engine may flood due to rich fueling during extreme temperature weather conditions, when an operator depresses/pumps the gas pedal repeatedly during cranking, or due to excess fuel inside the cylinders (e.g., due to a degraded fuel injector). When the spark plugs become wet-fouled, they are unable to produce a spark across the electrode, thus delaying or preventing engine start. In some instances, engine flooding may cause a frustrated vehicle operator to continue cranking the engine until the battery drains. Further, vehicle emissions may be increased due to repeated unsuccessful cranks while the engine is flooded.

Other attempts to address spark plug wet-fouling include methods for removing fuel adhered to the spark plug while the spark plug remains in the engine. One example approach is shown by Ayame et al. in U.S. Pat. No. 7,523,744 B2. Therein, a method is disclosed that cranks the engine without injecting additional fuel in response to an indication that the engine has not started properly (e.g., within a duration of beginning the cranking).

However, the inventor herein has recognized potential issues with such systems. As one example, cranking the engine without providing additional airflow to dry the spark plugs may be inefficient, resulting in increased engine starting times. The increased engine starting times may increase vehicle operator frustration as well as consume excess battery charge. Further, the inventor herein has recognized that different vehicle systems may be utilized to provide the additional airflow based on a configuration of the vehicle and/or operating parameters. As one example, some engine systems may be configured with one or more boosting devices, such as turbochargers or superchargers, to increase airflow into a combustion chamber. Turbochargers and superchargers compress intake air entering the engine using an intake compressor. While a turbocharger includes a compressor that is mechanically driven by an exhaust turbine, an electric supercharger includes a compressor that is electrically driven by a motor. Therefore, the electric supercharger may be used to provide on-demand airflow. As another example, some engine systems may be configured with an evaporative emissions system that includes a pump operable in a positive pressure mode in which air is drawn into the evaporative emissions system from the atmosphere. As such, the pump of the evaporative emissions system may also be used to provide on-demand airflow. As still another example, some engine systems may include both the electric supercharger and the evaporative emissions system including the pump.

In one example, the issues described above may be addressed by a method comprising: in response to flooding a combustion chamber of a spark ignition engine with fuel during an engine start attempt, shutting off fuel delivery to the combustion chamber and directing compressed air from an electrically driven compressor through the combustion chamber under predetermined conditions prior to a subsequent engine start attempt. In this way, on-demand airflow may be provided by the electrically driven compressor to dry a wet-fouled spark plug coupled within the combustion chamber, thereby reducing engine starting times and decreasing vehicle emissions.

As one example, such as when an evaporative emissions system having a pump operable in a positive pressure mode is fluidically coupled to an intake of the engine, the predetermined conditions may include a load of a fuel vapor storage canister of the evaporative emissions system being greater than or equal to a threshold load. For example, the method may include selecting between directing the compressed air from the electrically driven compressor and directing air from the evaporative emissions system through the combustion chamber based on the load of the fuel vapor storage canister. As another example, air (e.g., provided by the electrically driven compressor or the evaporative emissions system) may be directed through the combustion chamber while the engine is at rest, such as by positioning the engine with an intake and an exhaust valve of the combustion chamber open via an electric motor, or while the engine is continuously spinning via the electric motor. The method may include selecting between flowing the air through the combustion chamber while the engine is at rest and while the engine is continuously spinning based on a state of charge of a system battery. For example, flowing the air through the combustion chamber while the engine is at rest may be selected when the state of charge is less than a threshold state of charge, and flowing the air through the combustion chamber while the engine is spinning may be selected when the state of charge is greater than or equal to the threshold. By flowing the air through the combustion chamber while the engine is spinning while the state of charge is greater than or equal to the threshold state of charge, engine starting times may be decreased compared with flowing the air through the combustion chamber while the engine is at rest, whereas by flowing the air through the combustion chamber while the engine is at rest, battery consumption may be decreased compared with flowing the air through the combustion chamber while the engine is spinning. Overall, wet-fouled spark plugs may be dried faster than when no additional airflow is provided, decreasing the engine starting times and thereby decreasing vehicle operator frustration.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
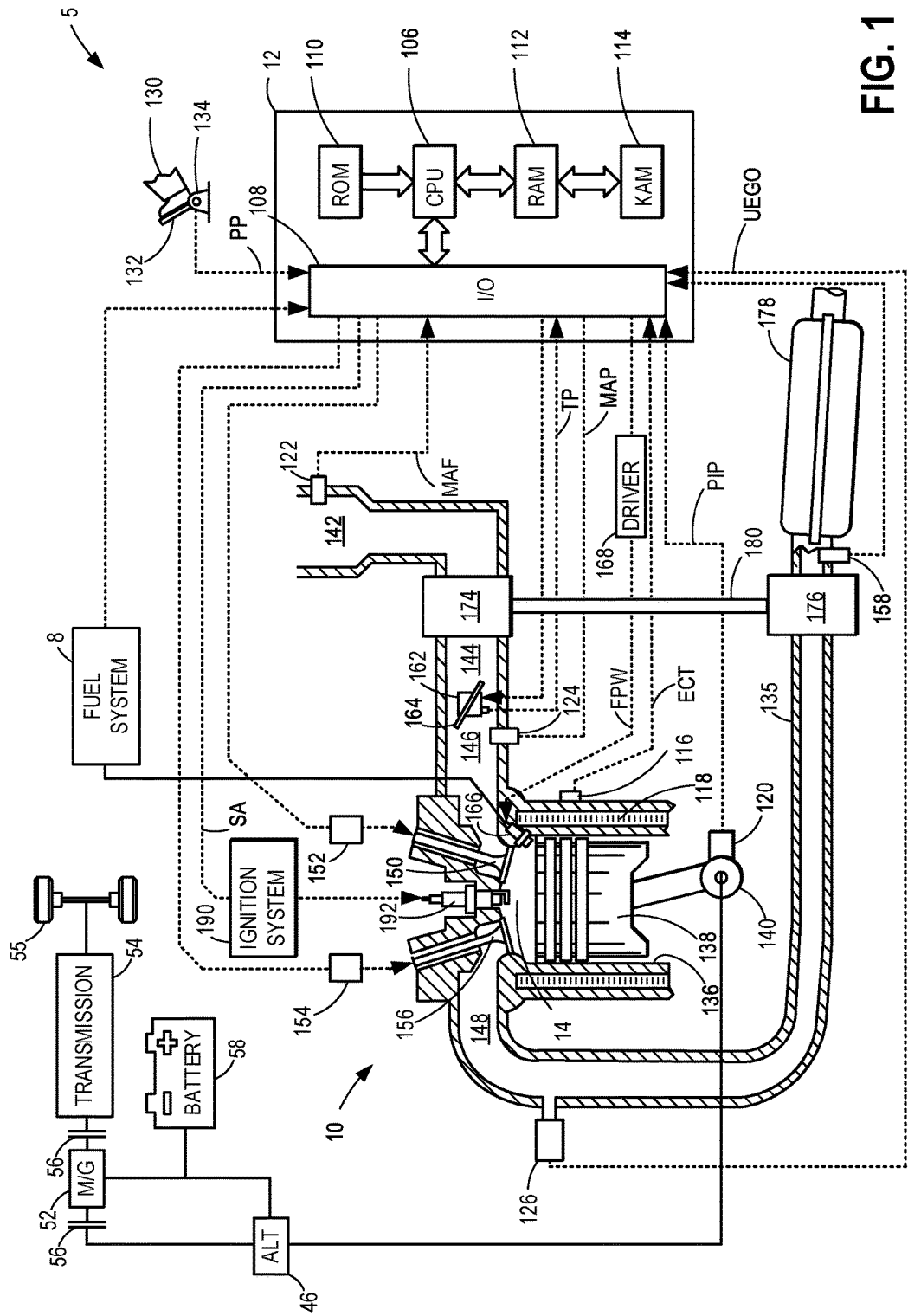
FIG. 1 shows a schematic depiction of an example vehicle system.
Figure 2:
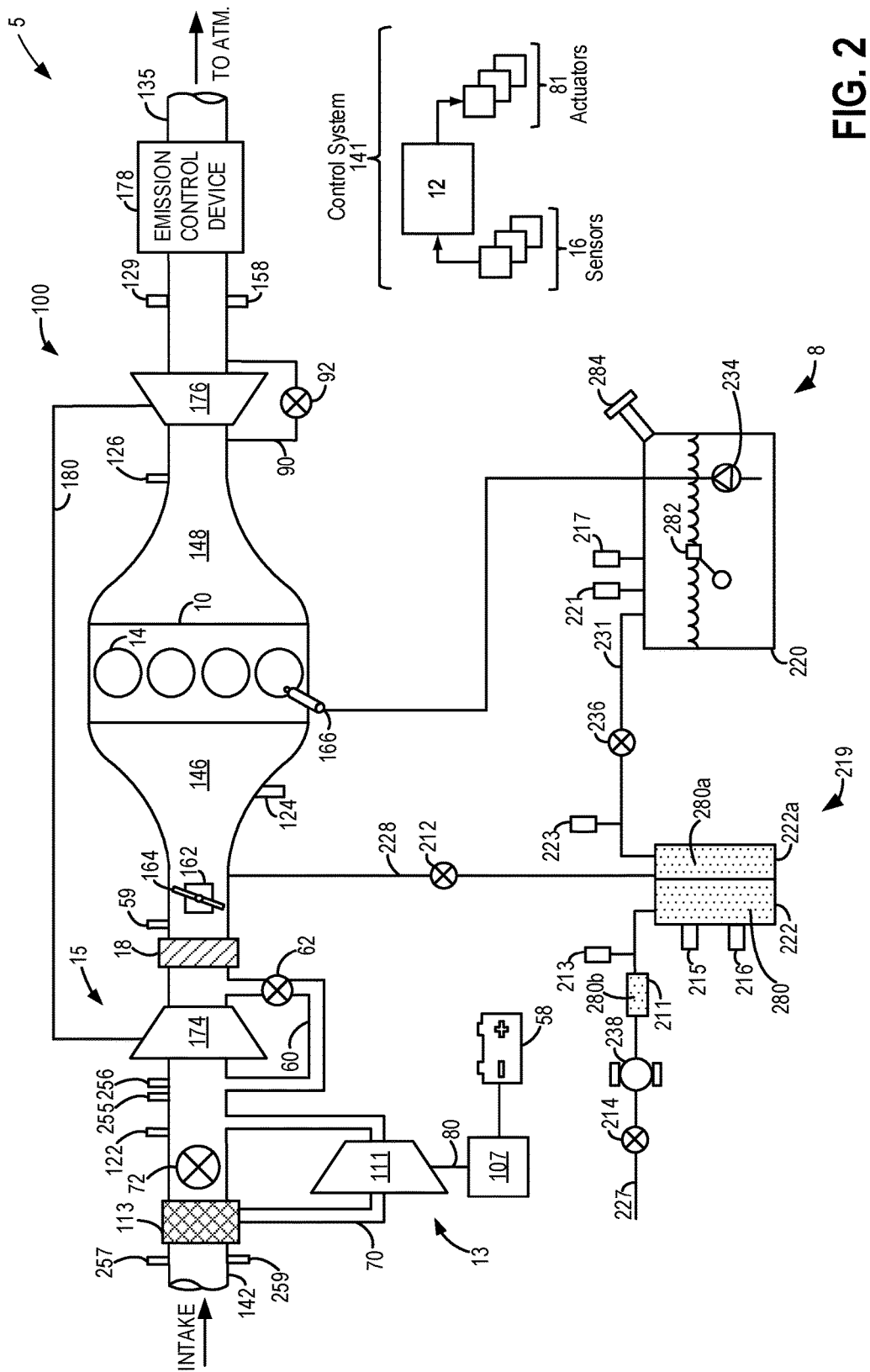
FIG. 2 shows an example of a compound boosted engine system having multiple staged intake compression devices.

The following description relates to systems and methods for mitigating spark plug wet-fouling in an engine system, such as the engine system shown in FIGS. 1 and 2, by providing on-demand airflow via one or more sources. For example, the engine system may include an evaporative emissions system as well as an electric boosting device, as shown in FIG. 2. In response to an indication of spark plug wet-fouling, a controller may select among each of drying the spark plugs via airflow from the evaporative emissions system and drying the spark plugs via airflow from the electric boosting device based on a load of a fuel vapor storage canister of the evaporative emissions system, such as according to the example method of FIG. 3. For example, the evaporative emissions system may be utilized to provide a hot, forced airflow to the wet-fouled spark plugs, such as according to the method of FIG. 4. As described in FIG. 2, a pump of the evaporative emissions system may be configured to draw in ambient air and flow it through a fuel vapor storage canister fitted with a heating element. Once heated by the heating element and the hot fuel vapor storage canister, the air and fuel vapors may flow to an intake of the engine and through one or more cylinders. The heated gas may be flowed through the cylinders sequentially (e.g., one cylinder at a time, while the engine is at rest), as shown in the example timeline of FIG. 6, or through all of the cylinders simultaneously (e.g., while the engine is spun electrically), as shown in the example timeline of FIG. 7, based on a state of charge of a system battery. As another example, the electric boosting device may provide pressurized forced airflow to the wet-fouled spark plugs, such as according to the example method of FIG. 5. The pressurized air may be flowed through the cylinders sequentially, as shown in the example timeline of FIG. 8, or through all of the cylinders simultaneously, as shown in the example method of FIG. 9, based on the state of charge of the system battery.

Turning now to the figures, FIG. 1 depicts an example of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG.

1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. As will be described with reference to FIG. 2, engine 10 may be configured with a dual stage, compound boosting system that includes the turbocharger and an electric supercharger to overcome lag time while the turbocharger spins up in response to an operator demand for torque. The electric supercharger also may be used while the engine is off to supply on-demand pressurized air for drying wet-fouled spark plugs, as further described herein.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO. Emission control device 178 may be a three-way catalyst, a NOx trap, various other emission control devices, or combinations thereof. In the example of FIG. 1, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system). As an example, valve operation may be adjusted to increase an amount of positive valve overlap between intake valve 150 and exhaust valve 156 to mitigate spark plug wet-fouling, as will be described with respect to FIG. 3.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternate example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

As will be described with respect to FIG. 2, in some examples, fuel system 8 may be coupled to an evaporative emissions system. Fuel vapors may be routed to the evaporative emissions system for storage before being purged to the engine intake for use as fuel at a later time. Further, a diagnostic pump may be included in the evaporative emissions system to aid in the detection of undesired evaporative emissions, and the pump may also be used to dry wet-fouled spark plugs, as further described herein.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a profile ignition pickup signal (PIP) from a Hall effect sensor 120 (or other type) coupled to crankshaft 140; throttle position (TP) from a throttle position sensor; signal UEGO from exhaust gas sensor 126, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, the controller may detect an indication of spark plug wet-fouling, such as based on signal TP from the throttle position sensor during an engine start attempt, as will be described with respect to FIG. 3. In response to the indication of spark plug wet-fouling, the controller may select between drying the spark plugs via heated air provided by the evaporative emissions system (as will be described with respect to FIG. 4) and via pressurized air provided by an electric boosting device (as will be described with respect to FIG. 5).

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Next, FIG. 2 schematically shows aspects of an example engine system 100, including engine 10, that may be coupled in vehicle 5. Components described with reference to FIG. 2 that have the same identification labels as components described with reference to FIG. 1 are the same components and may operate as previously described. Further, some components may not be reintroduced.

In the depicted example, engine 10 is a compound boosted engine configured with multiple, staged boosting devices. Specifically, engine 10 includes an electric supercharger 13 staged upstream of a turbocharger 15, although other configurations may be possible without departing from the scope of this disclosure (such as turbocharger 15 staged upstream of electric supercharger 13). The depicted configuration results in a first compressor 111 (of electric supercharger 13) being positioned in intake passage 142 upstream of a second compressor 174 (of turbocharger 15). As shown, electric supercharger 13 includes an electric motor 107. In alternate embodiments, turbocharger 15 may be an electric turbocharger having an electric motor coupled to compressor 174, turbine 176, or shaft 180 while supercharger 13 is configured as an electric or mechanical supercharger. In other examples, both the first and second boosting device may be electric superchargers or electric turbochargers. In still other examples, only a single boosting device, such as an electric supercharger or an electric turbocharger, may be included in engine system 100.

In the depicted example, first compressor 111 is driven by electric motor 107. Specifically, a fan of first compressor 111 may be driven by electrical power received from electric motor 107 along a supercharger compressor shaft 80. In some examples, first compressor 111 of supercharger 13 may additionally be driven by the engine crankshaft via a clutch and gear mechanism. Electric motor 107 may be powered by an on-board energy storage device, such as system battery 58. Electric motor 107 may be additionally or alternatively powered by alternator 46 (shown in FIG. 1). An amount of electrical power delivered to electric motor 107 may be varied in order to adjust a duty cycle of electric supercharger 13. In one example, the amount of electrical power delivered to electric motor 107 may be increased to increase the speed of first compressor 111, with a corresponding increase in the electrical load applied on the alternator and a decrease in alternator current. As a result, electric supercharger 13 may be rapidly spun up, providing for a fast-acting or high frequency boost actuation.

Turbocharger 15 includes second compressor 174, which is driven by turbine 176 via shaft 180. Turbine 176 is driven by expanding engine exhaust. In one example, turbocharger 15 may be a twin scroll device. In another example, turbocharger 15 may be a variable geometry turbocharger (VGT), wherein turbine geometry is actively varied as a function of engine operating conditions.

During selected conditions, air may enter first compressor 111 when an opening of an electric supercharger bypass valve (ESBV) 72 is decreased, thereby directing incoming air from an air filter 113 through a first compressor bypass passage 70 and through first compressor 111, where it is pressurized for delivery to second compressor 174. Fresh air received at an inlet of second compressor 174 is then compressed and introduced into engine 10. As the opening of ESBV 72 increases, an amount of air entering second compressor 174 without having passed through first compressor bypass passage 70 and first compressor 111 increases. During conditions when ESBV 72 is fully opened, pressurized air may be delivered to engine 10 via second compressor 174 of turbocharger 15 without passing through first compressor 111 of electric supercharger 13.

During selected conditions, air compressed by turbocharger 15 may be recirculated from an outlet to an inlet of second compressor 174 through a second compressor bypass passage 60 by adjusting an opening of a compressor recirculation valve (CRV) 62. CRV 62 may be a continuously variable valve, and increasing the opening of the CRV 62 may include actuating (or energizing) a solenoid of the valve. One or both of CRV 62 and ESBV 72 may be continuously variable valves wherein a position of the valve is continuously variable from a fully closed position to a fully open position. Alternatively, CRV 62 may be a continuously variable valve while ESBV 72 is an on-off valve. In some embodiments, CRV 62 may be partially open during boosted engine operation to provide a surge margin. Herein, the partially open position may be a default valve position. Then, in response to an indication of surge, the opening of CRV 62 may be increased. For example, CRV 62 may be adjusted from the default, partially open position toward a fully open position, with a degree of opening based on the indication of surge (e.g., the compressor ratio, the compressor flow rate, a pressure differential across the compressor, etc.). In alternate examples, CRV 62 may be held closed during boosted engine operation (e.g., peak performance conditions) to decrease boost response time and increase peak performance.

As shown in FIG. 2, air flows from second compressor 174 through a charge air cooler (CAC) 18 and throttle 162 to intake manifold 146. CAC 18 may be an air-to-air or water-to-air heat exchanger, for example. Intake manifold pressure (e.g., a pressure of the air charge within the intake manifold) may be determined using MAP sensor 124.

Intake manifold 146 is coupled to a plurality of cylinders 14 of engine 10 through a series of intake valves (e.g., intake valve 150 as shown in FIG. 1). Cylinders 14 are further coupled to exhaust manifold 148 via a series of exhaust valves (e.g., exhaust valve 156 as shown in FIG. 1). In the depicted embodiment, a single exhaust manifold 148 is shown. However, in other embodiments, the exhaust manifold may include a plurality of exhaust manifold sections. Configurations having a plurality of exhaust manifold sections may enable effluent from different combustion chambers to be directed to different locations in the engine system.

As shown in FIG. 2, exhaust from exhaust manifold 148 is directed to turbine 176 to drive the turbine. When reduced turbine torque is desired, a portion of the exhaust may be directed instead through a wastegate 90, bypassing the turbine. A wastegate actuator 92 (e.g., wastegate valve) may be actuated open to relieve at least some exhaust pressure from upstream of turbine 176 to a location downstream of turbine 176 via wastegate 90. By reducing exhaust pressure upstream of turbine 176, turbine speed may be reduced.

The combined flow from turbine 176 and wastegate 90 flows through emission control device 178. All or part of the treated exhaust from emission control device 178 may be released into the atmosphere via exhaust passage 135. Depending on operating conditions, however, some exhaust may be diverted instead to intake passage 142 via an exhaust gas recirculation (EGR) passage (not shown), including an EGR cooler and an EGR valve. EGR may be recirculated to the inlet of first compressor 111, the inlet of second compressor 174, or both.

One or more sensors may be coupled to the inlet of second compressor 174 (as shown) and/or first compressor 111 (not shown). For example, a temperature sensor 255 may be coupled to the inlet of second compressor 174 for estimating a compressor inlet temperature. As another example, a pressure sensor 256 may be coupled to the inlet of second compressor 174 for estimating a pressure of air entering the second compressor. Still other sensors may include, for example, air-fuel ratio sensors, humidity sensors, etc. In other examples, one or more of the second compressor inlet conditions (such as humidity, temperature, etc.) may be inferred based on engine operating conditions. The sensors may estimate a condition of the intake air received at the second compressor inlet from the intake passage as well as the aircharge recirculated from upstream of CAC 18. One or more sensors may also be coupled to intake passage 142 upstream of first compressor 111 for determining a composition and condition of aircharge entering the first compressor. These sensors may include, for example, a humidity sensor 257 and a pressure sensor 259. Humidity sensor 257 may be any type of humidity sensor, such as a relative humidity sensor or an absolute humidity sensor, and may provide an indication of ambient humidity. Pressure sensor 259 may provide an indication of ambient (e.g., barometric) pressure. In addition, a throttle inlet pressure (TIP) sensor 59 may be coupled downstream of CAC 18 and upstream of throttle 162 for estimating a boost pressure delivered to the engine.

In the example of FIG. 2, engine system 100 is shown coupled to fuel system 8 and an evaporative emissions system 219. Fuel system 8 includes a fuel tank 220 coupled to a fuel pump 234, the fuel tank supplying a fuel to engine 10 that propels vehicle 5. Evaporative emissions system 219 includes a fuel vapor storage canister 222. During a fuel tank refueling event, fuel may be pumped into the vehicle from an external source through a refueling port 284. Fuel tank 220 may hold a plurality of fuel blends, including fuel with a range of alcohol concentrations, such as various gasoline-ethanol blends, including E10, E85, gasoline, etc., and combinations thereof, as described with respect to FIG. 1. A fuel level sensor 282 located in fuel tank 220 may provide an indication of a fuel level ("Fuel Level Input") to controller 12. As depicted, fuel level sensor 282 may comprise a float connected to a variable resistor. Alternatively, other types of fuel level sensors may be used.

Fuel pump 234 is configured to deliver pressurized fuel to fuel injectors of engine 10, such as fuel injector 166. It will be appreciated that fuel system 8 may be a return-less fuel system, a return fuel system, or various other types of fuel system. Vapors generated in fuel tank 220 may be routed to fuel vapor storage canister 222 via a conduit 231 for storage before being purged to intake manifold 146.

Fuel vapor storage canister 222 is filled with an appropriate adsorbent 280 for temporarily trapping fuel vapors (including vaporized hydrocarbons) generated during fuel tank refueling operations, diurnal vapors, and/or running-loss vapors. In one example, adsorbent 280 is activated charcoal (e.g., carbon). While a single fuel vapor storage canister 222 is shown, it will be appreciated that fuel system 8 and evaporative emissions system 219 may include any number of fuel vapor storage canisters. When purging conditions are met, such as when the fuel vapor storage canister is saturated, vapors stored in fuel vapor storage canister 222 may be purged to intake manifold 146 via a purge line 228 and by opening a canister purge valve (CPV) 212, which may be a normally closed valve. In one example, canister purge valve 212 may be a solenoid valve wherein opening or closing of the valve is performed via actuation of a canister purge solenoid.

Fuel vapor storage canister 222 may include a buffer 222a (or buffer region), each of the fuel vapor storage canister and the buffer comprising adsorbent. For example, buffer 222a is shown packed with an adsorbent 280a. As shown, the volume of buffer 222a may be smaller than (e.g., a fraction of) the volume of fuel vapor storage canister 222. Adsorbent 280a in the buffer 222a may be same as or different from adsorbent 280 in the fuel vapor storage canister (e.g., both may include charcoal). Buffer 222a may be positioned within fuel vapor storage canister 222 such that during fuel vapor storage canister loading, fuel tank vapors are first adsorbed within the buffer, and then when the buffer is saturated, further fuel tank vapors are adsorbed in the fuel vapor storage canister. In comparison, during fuel vapor storage canister purging, fuel vapors are first desorbed from the fuel vapor storage canister (e.g., to a threshold amount) before being desorbed from the buffer. In other words, loading and unloading of the buffer is not linear with the loading and unloading of the fuel vapor storage canister. As such, the effect of the fuel vapor storage canister buffer is to dampen any fuel vapor spikes flowing from the fuel tank to the fuel vapor storage canister, thereby reducing the possibility of any fuel vapor spikes going to the engine.

Fuel vapor storage canister 222 includes a vent 227 for routing gases out of the fuel vapor storage canister 222 to the atmosphere when storing fuel vapors from fuel tank 220. Vent 227 may also allow fresh air to be drawn into fuel vapor storage canister 222 when purging stored fuel vapors to intake manifold 146 via purge line 228 and canister purge valve 212. In another example, fresh air may be drawn into evaporative emissions system 219 by a pump 238 included in vent 227. Pump 238 may be used in either vacuum or positive pressure modes to produce a predetermined pressure within evaporative emissions system 219, which as to perform various evaporative emissions system diagnostic tests. As will be described herein, pump 238 may be used in the positive pressure mode to supply air to intake manifold 146 to dry wet-fouled spark plugs. While this example shows vent 227 communicating with fresh, unheated air, various modifications may also be used.

Vent 227 may include a canister vent valve (CVV) 214 to adjust a flow of air and vapors between fuel vapor storage canister 222 and the atmosphere. When included, the vent valve may be a normally open valve so that air, stripped of fuel vapor after having passed through the fuel vapor storage canister, can be pushed out to the atmosphere (for example, during refueling while the engine is off). Likewise, during purging operations (for example, during fuel vapor storage canister regeneration and while the engine is running), the fuel vapor storage canister vent valve may be opened to allow a flow of fresh air to strip the fuel vapors stored in the fuel vapor storage canister. In one example, canister vent valve 214 may be a solenoid valve wherein opening or closing of the valve is performed via actuation of a canister vent solenoid. In particular, the canister vent valve may be in an open position that is closed upon actuation of the canister vent solenoid.

Evaporative emissions system 219 may further include a bleed fuel vapor storage canister 211. Hydrocarbons that desorb from fuel vapor storage canister 222 (hereinafter also referred to as the "main fuel vapor storage canister") may be adsorbed within the bleed fuel vapor storage canister. Bleed fuel vapor storage canister 211 may include an adsorbent 280b that is different than the adsorbent material included in main fuel vapor storage canister 222. Alternatively, adsorbent 280b in bleed fuel vapor storage canister 211 may be the same as that included in main fuel vapor storage canister 222.

A hydrocarbon (HC) sensor 213 may be present in evaporative emissions system 219 to indicate the concentration of hydrocarbons in vent 227. As illustrated, hydrocarbon sensor 213 is positioned between main fuel vapor storage canister 222 and bleed fuel vapor storage canister 211. A probe (e.g., sensing element) of hydrocarbon sensor 213 is exposed to and senses the hydrocarbon concentration of fluid flow in vent 227. Hydrocarbon sensor 213 may be used by controller 12 for determining breakthrough of hydrocarbon vapors from main fuel vapor storage canister 222, in one example.

One or more temperature sensors 215 may be coupled to and/or within fuel vapor storage canister 222. As fuel vapor is adsorbed by the adsorbent in the fuel vapor storage canister, heat is generated (heat of adsorption). Likewise, as fuel vapor is desorbed by the adsorbent in the fuel vapor storage canister, heat is consumed. In this way, the adsorption and desorption of fuel vapor by the fuel vapor storage canister may be monitored and estimated based on temperature changes within the fuel vapor storage canister, which may be used to estimate canister load. Further, one or more canister heating elements 216 may be coupled to and/or within fuel vapor storage canister 222. Canister heating element 216 may be used to selectively heat the fuel vapor storage canister (and the adsorbent contained within) for example, to increase desorption of fuel vapors prior to performing a purge operation. As another example, canister heating element 216 may be activated in response to an indication of spark plug wet-fouling to heat air drawn in through vent 227 by pump 238. Canister heating element 216 may comprise an electric heating element, such as a conductive metal, ceramic, or carbon element that may be heated electrically. In some examples, canister heating element 216 may comprise a source of microwave energy or may comprise a fuel vapor storage canister jacket coupled to a source of hot air or hot water. Canister heating element 216 may be coupled to one or more heat exchangers that may facilitate the transfer of heat, (e.g., from hot exhaust) to fuel vapor storage canister 222. Canister heating element 216 may be configured to heat air within fuel vapor storage canister 222 and/or to directly heat the adsorbent located within fuel vapor storage canister 222. In some embodiments, canister heating element 216 may be included in a heater compartment coupled to the interior or exterior of fuel vapor storage canister 222. In some embodiments, fuel vapor storage canister 222 may be coupled to one or more cooling circuits and/or cooling fans. In this way, fuel vapor storage canister 222 may be selectively cooled to increase adsorption of fuel vapors (e.g., prior to a refueling event). In some examples, canister heating element 216 may comprise one or more Peltier elements, which may be configured to selectively heat or cool fuel vapor storage canister 222.

Vehicle 5 may have reduced engine operation times due to the vehicle being powered by engine system 100 during some conditions and by electric machine 52 (as shown in FIG. 1) in other conditions (such as when vehicle 5 is a hybrid vehicle) or due to the engine shutting down when the vehicle is on and at rest (such as when vehicle 5 is a stop/start vehicle). While the reduced engine operation times reduce overall carbon emissions from the vehicle, they may also lead to insufficient purging of fuel vapors from evaporative emissions system 219. To at least partially address this, a fuel tank isolation valve (FTIV) 236 may be optionally included in conduit 231 such that fuel tank 220 is coupled to fuel vapor storage canister 222 via the FTIV 236. During regular engine operation, FTIV 236 may be kept closed to limit an amount of diurnal or "running loss" vapors directed to fuel vapor storage canister 222 from fuel tank 220. During refueling operations and selected purging conditions, FTIV 236 may be temporarily opened, e.g., for a duration, to direct fuel vapors from fuel tank 220 to fuel vapor storage canister 222. By opening the valve during purging conditions or when the fuel tank pressure is higher than a threshold (e.g., above a mechanical pressure limit of the fuel tank), the refueling vapors may be released into the fuel vapor storage canister and the fuel tank pressure may be maintained below pressure limits. While the depicted example shows FTIV 236 positioned along conduit 231, in alternate embodiments, the FTIV may be mounted on fuel tank 220.

One or more pressure sensors may be coupled to fuel system 8 and evaporative emissions system 219 for providing an estimate of a fuel system and an evaporative emissions system pressure, respectively. In the example illustrated in FIG. 2, a first pressure sensor 217 is coupled directly to fuel tank 220, and a second pressure sensor 233 is coupled to conduit 231 between FTIV 236 and fuel vapor storage canister 222. For example, first pressure sensor 217 may be a fuel tank pressure transducer (FTPT) coupled to fuel tank 220 for measuring a pressure of fuel system 8, and second pressure sensor 233 may measure a pressure of evaporative emissions system 219. In alternative embodiments, first pressure sensor 217 may be coupled between fuel tank 220 and fuel vapor storage canister 222, specifically between the fuel tank and FTIV 236. In still other embodiments, a single pressure sensor may be included for measuring both the fuel system pressure and the evaporative system pressure, such as when FTIV 236 is open or omitted. In some examples, controller 12 may infer and indicate undesired evaporative emissions (e.g., undesired hydrocarbon emissions) based on changes in an evaporative emissions system pressure during a diagnostic test.

One or more temperature sensors 221 may also be coupled to fuel system 8 for providing an estimate of a fuel system temperature. In one example, the fuel system temperature is a fuel tank temperature, wherein temperature sensor 221 is a fuel tank temperature sensor coupled to fuel tank 220. While the depicted example shows temperature sensor 221 directly coupled to fuel tank 220, in alternate embodiments, the temperature sensor may be coupled between fuel tank 220 and fuel vapor storage canister 222.

Fuel vapors released from fuel vapor storage canister 222, such as during a purging operation, may be directed into intake manifold 146 via purge line 228. The flow of vapors along purge line 228 may be regulated by canister purge valve 212. The quantity and rate of vapors released by the fuel vapor storage canister purge valve may be determined by the duty cycle of an associated canister purge valve solenoid (not shown). As such, the duty cycle of the canister purge valve solenoid may be determined by controller 12 responsive to engine operating conditions, including, for example, engine speed-load conditions, an air-fuel ratio, a fuel vapor storage canister load, etc. By commanding the canister purge valve to be closed, the controller may seal the fuel vapor recovery system from the engine intake. An optional canister check valve (not shown) may be included in purge line 228 to prevent intake manifold pressure from flowing gases in the opposite direction of the purge flow. As such, the check valve may be beneficial if the canister purge valve control is not accurately timed or the canister purge valve itself can be forced open by a high intake manifold pressure.

Fuel system 8 and evaporative emissions system 219 may be operated by controller 12 in a plurality of modes by selectively adjusting the various valves and solenoids. For example, the fuel system and evaporative emissions system may be operated in a refueling mode (e.g., when fuel tank refueling is requested by a vehicle operator), wherein controller 12 may open FTIV 236 while maintaining canister purge valve 212 closed and canister vent valve 214 open to depressurize the fuel tank before enabling fuel to be added therein. As such, FTIV 236 may be kept open during the refueling operation to allow refueling vapors to be stored in the fuel vapor storage canister. After refueling is completed, FTIV 236 may be closed. By maintaining canister purge valve 212 closed, refueling vapors are directed into fuel vapor storage canister 222 while preventing the fuel vapors from flowing into the intake manifold. As another example, the fuel system and the evaporative emissions system may be operated in a fuel vapor storage canister purging mode (e.g., after an emission control device light-off temperature has been attained and with the engine running), wherein controller 12 may open canister purge valve 212 and while maintaining canister vent valve 214 open and FTIV 236 closed. The vacuum generated through natural engine aspiration may be used to draw fresh air through vent 227 and through fuel vapor storage canister 222 to purge the stored fuel vapors into intake manifold 146. In this mode, the purged fuel vapors from the fuel vapor storage canister are combusted in the engine. The purging may be continued until the stored fuel vapor amount in the fuel vapor storage canister is below a threshold, for example.

During purging, the learned vapor amount/concentration may be used to determine the amount of fuel vapors stored in the fuel vapor storage canister, and then during a later portion of the purging operation (when the fuel vapor storage canister is sufficiently purged or empty), the learned vapor amount/concentration may be used to estimate a loading state of the fuel vapor storage canister. For example, one or more oxygen sensors (not shown) may be coupled to the fuel vapor storage canister 222 (e.g., downstream of the fuel vapor storage canister) or positioned in the engine intake and/or engine exhaust to provide an estimate of a fuel vapor storage canister load (that is, an amount of fuel vapors stored in the fuel vapor storage canister). Based on the fuel vapor storage canister load and further based on engine operating conditions, such as engine speed-load conditions, a purge flow rate may be determined.

Controller 12 may be included in a control system 141. Controller 12 is shown receiving information from a plurality of sensors 16 (various examples of which are described herein) and sending control signals to a plurality of actuators 81 (various examples of which are described herein). As one example, sensors 16 may include exhaust gas sensor 126, MAP sensor 124, exhaust temperature sensor 158, an exhaust pressure sensor 129, compressor inlet temperature sensor 155, compressor inlet pressure sensor 256, MAF sensor 122, pressure sensor 259, and TIP sensor 59. Other sensors, such as additional pressure, temperature, air/fuel ratio, humidity, and composition sensors, may be coupled to various locations in engine system 100. The actuators 81 may include, for example, throttle 162, CRV 62, ESBV 72, electric motor 107, wastegate actuator 92, fuel injector 166, CPV 212, and pump 238. Controller 12 may receive input data from the various sensors, process the input data, and employ the various actuators to adjust engine operation based on the received signals and instructions stored on a memory of the controller. The controller may employ the actuators in response to the processed input data based on instruction or code programmed therein corresponding to one or more routines, such as example control routines described herein with regard to FIGS. 3-5. As an example, responsive to an indication of spark plug wet-fouling, the spark plugs may be dried with pressurized air provided by electric supercharger 13 or heated air provided by pump 238 and canister heating element 216 of evaporative emissions system 219. Controller 12 may select between the airflow sources (e.g., the electric supercharger or the evaporative emissions system) according to the methods described below. Further, controller 12 may select between indexing the engine to flow air through one cylinder at a time and continuously spinning the engine to flow air through every cylinder, as also described below.

Figure 3:
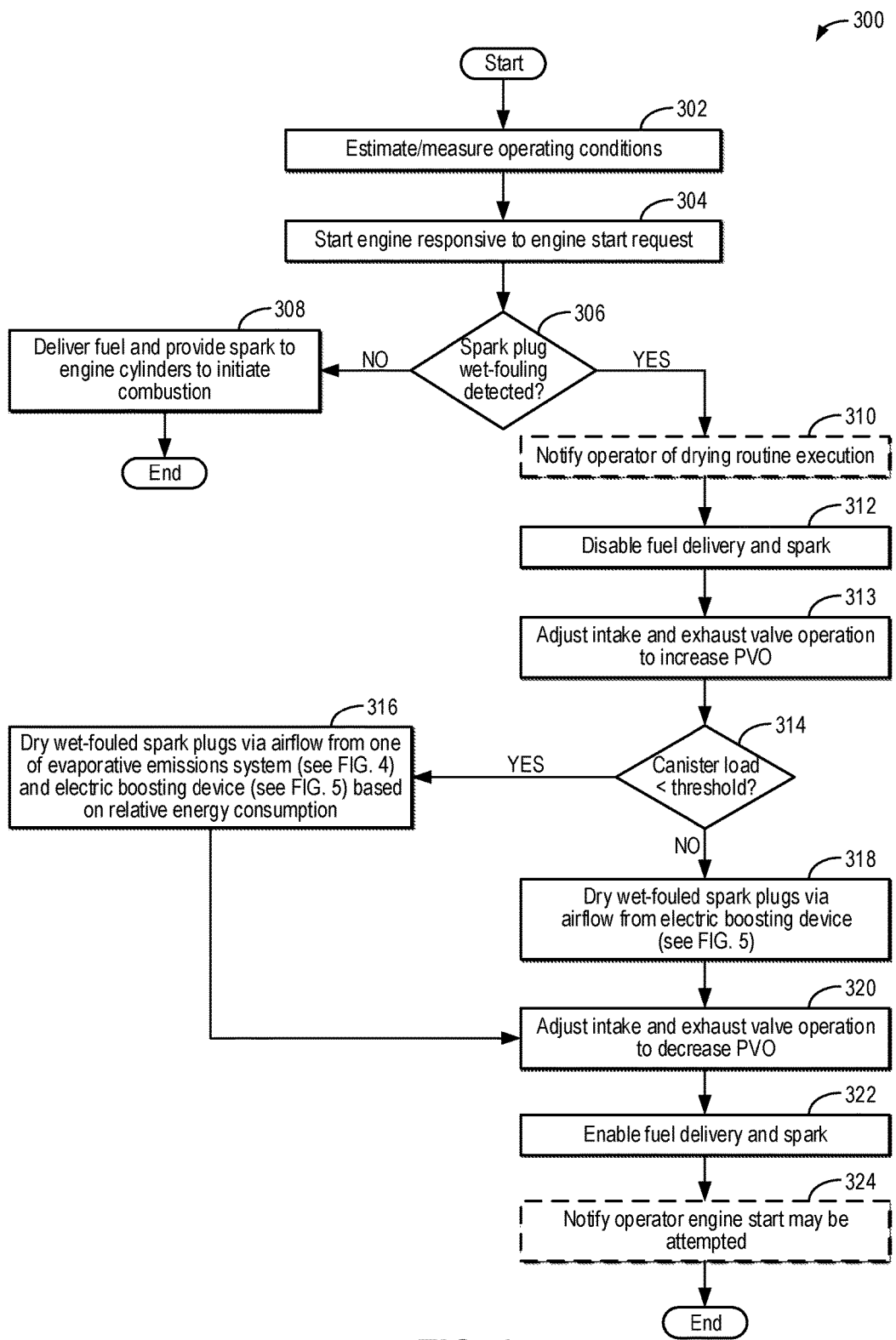
FIG. 3 depicts a high-level example method for determining a spark plug wet-fouling condition and selecting a source for providing airflow to dry the wet-fouled spark plugs.

FIG. 3 shows an example method 300 for detecting wet-fouled spark plugs in an engine system and, in response thereto, selecting an airflow source and drying the wet-fouled spark plugs. For example, method 300 may be executed prior to an engine start attempt so that wet-fouled spark plugs may be detected during the engine start attempt and subsequently dried using on-demand airflow provided by an evaporative emissions system (e.g., evaporative emissions system 219 of FIG. 2) or an electric boosting device (e.g., electric supercharger 13 of FIG. 2). Instructions for carrying out method 300 and the rest of the methods included herein may be executed by a controller (e.g., controller 12 of FIGS. 1 and 2) based on instructions stored on a memory of the controller and in conjunction with signals received from sensors of the engine system, such as the sensors described above with reference to FIGS. 1 and 2 (e.g., exhaust gas sensor 126 of FIGS. 1 and 2). The controller may employ actuators of the engine system (e.g., spark plug 192 of FIG. 1, fuel injector 166 of FIGS. 1 and 2, intake valve actuator 152 of FIG. 1, and exhaust valve actuator 154 of FIG. 1) to adjust engine operation according to the methods described below.

Method 300 begins at 302 and includes estimating and/or measuring operating conditions. Operating conditions may include, for example, ambient temperature, ambient pressure, ambient humidity, throttle position (e.g., from signal TP output by a throttle position sensor), accelerator pedal position (e.g., signal PP output by a pedal position sensor), an exhaust gas air-fuel ratio (e.g., as determined from signal UEGO output by the exhaust gas sensor), engine coolant temperature, a state of the engine, and an ignition state of the vehicle. The state of the engine may refer to whether the engine is on (e.g., operating at a non-zero speed, with combustion occurring within engine cylinders) or off (e.g., at rest, without combustion occurring in the engine cylinders). The ignition state of the vehicle may refer to a position of an ignition switch. As an example, the ignition switch may be in an "off" position, indicating that the vehicle is off (e.g., powered down, with a vehicle speed of zero), but with an ignition key inserted (e.g., by a vehicle operator), indicating that a vehicle start may soon be requested. As a third example, the vehicle may be on and operating in an electric-only mode, in which an electric machine (e.g., electric machine 52 of FIG. 1) supplies torque to propel the vehicle and the engine is off and does not supply torque to propel the vehicle.

At 304, method 300 includes starting the engine responsive to an engine start request. In one example, the engine is started in response to the vehicle operator switching the ignition switch to an "on" position, such as by turning the ignition key, depressing an ignition button, or requesting an engine start from a remote device (such as a key-fob, smartphone, a tablet, etc.). In another example, the engine is started in response to the vehicle transitioning from the electric-only mode to an engine mode in which combustion occurs in the engine and the vehicle is propelled at least partially by engine-derived torque. For example, the vehicle may be transitioned to the engine mode when a state of charge (SOC) of a system battery (e.g., system battery 58 of FIGS. 1 and 2) drops below a threshold SOC. The threshold SOC may be a positive, non-zero battery SOC level below which the system battery may not be able to support or execute additional vehicle functions while propelling the vehicle via torque derived from the electric machine. As another example, the vehicle may be transitioned to the engine mode if vehicle operator torque demand rises above a threshold torque. The threshold torque may be a positive, non-zero amount of torque that cannot be met or sustained by the electric machine alone, for example. Starting the engine may include cranking the engine with an electric motor, such as a starter motor or the electric machine. The engine may be cranked at a speed that enables combustion to commence and the engine to maintain momentum during starting, such as a speed in the range of 50-100 RPM, for example.

At 306, it is determined if spark plug wet-fouling is detected. For example, spark plug wet-fouling may be detected if there is an indication of a flooded engine. The flooded engine may be indicated by a wide open throttle (WOT) signal, generated when the vehicle operator depresses the accelerator pedal to its maximum extent, during engine cranking. In some examples, the controller may be configured to reduce or cease fuel injection during cranking in response to the WOT signal, such as by reducing or completely suppressing fuel injection pulses, thereby preventing the spark plugs from becoming coated with fuel. In other examples, a WOT signal during cranking is an indication of spark plug wet-fouling. As another example, the flooded engine may be inferred by the exhaust gas sensor indicating a rich AFR during cranking (e.g., an AFR determined from an output of the exhaust gas sensor is less than a threshold AFR). As still another example, the flooded engine (and therefore, spark plug wet-fouling) may be inferred by a lack of engine start after a predetermined number of engine start attempts.

If spark plug wet-fouling is not detected, such as when the WOT signal is not present during cranking, the determined AFR is not less than the threshold AFR, or the engine starts within the predetermined number of engine start attempts, method 300 proceeds to 308 and includes delivering fuel and providing spark to the engine cylinders to initiate combustion. For example, fuel may be delivered to the engine cylinders by actuating fuel injectors with a nominal fuel pulse-width for an engine start and the given operating conditions. The controller may determine the fuel pulse-width by inputting the operating conditions, including ambient humidity, MAF (as output by a MAF sensor, such as MAF sensor 122 of FIGS. 1 and 2), the determined AFR, and a desired AFR, into one or more look-up tables, algorithms, and/or maps and output the fuel pulse-width to send to the fuel injectors. Similarly, spark may be provided at a nominal spark timing for the starting operation and the given operating conditions, such as at or near maximum brake torque (MBT) timing. The controller may input the operating conditions (such as engine speed and load, engine coolant temperature, ambient temperature, exhaust temperature, MAP, etc.) into one or more look-up tables, algorithms, and/or maps and output the spark timing. A signal SA sent to an ignition system (e.g., ignition system 190 of FIG. 1) at the determined spark timing may trigger firing of the spark plug to ignite the air-fuel mixture. Following 308, method 300 ends.

If spark plug wet-fouling is detected at 306, method 300 proceeds to 310 and optionally includes notifying the vehicle operator that a drying routine is being executed. For example, a message may be displayed to the vehicle operator, such as on a human-machine interface on a dash of the vehicle, stating that the drying routine is being executed and not to attempt further engine starts until prompted. With the vehicle operator notified, the vehicle operator may cease further engine start attempts, thereby avoiding potentially draining the system battery.

At 312, method 300 includes disabling fuel delivery and spark. With the engine flooded, delivery of additional fuel may exacerbate the wet-fouling, increase vehicle emissions, degrade an emission control device (e.g., emission control device 178 of FIGS. 1 and 2), and reduce fuel economy. By disabling fuel delivery, such as by maintaining the fuel injectors closed, further wet-fouling, emission control device degradation, increased vehicle emissions, and reduced fuel economy may be avoided. When wet-fouled, a spark plug may not be able to produce a spark across its electrode, and therefore, actuating the spark plug may be ineffective. Disabling spark in response to an indication of spark plug wet-fouling may reduce energy consumption and prevent excess spark plug wear, for example.

At 313, method 300 includes adjusting intake and exhaust valve operation to increase positive valve overlap (PVO), such as to maximize PVO. As described with respect to FIG. 1, each cylinder of the engine may include one or more intake valves (e.g., intake valve 150 of FIG. 1) and one or more exhaust valves (e.g., exhaust valve 156 of FIG. 1), the intake and exhaust valves each actuated by a respective valve actuator or valve actuation system. The intake valve and the exhaust valve may be opened and closed at given engine positions in an engine cycle. As an example, both the intake valve and the exhaust valve may be open near an end of the exhaust stroke when a piston within the cylinder is at or near TDC. Any VVT system may be used to increase PVO. For example, the controller may advance intake valve timing and/or retard exhaust valve timing relative to TDC of the exhaust stroke using a VCT or CPS system to increase PVO. As another example, the controller may extend a duration of opening of the intake and/or the exhaust valve using a CPS system or an oscillating cam system to increase PVO. As still another example, when the valve actuators are of the electric valve actuation type, the controller may vary the signals provided to the valve actuators to advance intake valve timing, retard exhaust valve timing, and/or extend the duration of opening of the intake and/or the exhaust valve to increase PVO. The intake and/or exhaust valve timing may be adjusted from a nominal intake and/or exhaust valve timing for an engine start and the given vehicle operating conditions, for example.

In an engine system that includes multiple sources for providing airflow while the engine is off, such as in the example of engine system 100 shown in FIG. 2, the controller may make a determination of which source to use. For example, the evaporative emissions system may provide hot forced airflow by activating the pump of the evaporative emissions system (e.g., in a positive pressure direction) and a canister heating element. As another example, the electric boosting device may provide pressurized air by spinning a compressor of the electric boosting device with an electric motor. In some examples, airflow from the electric boosting device may evaporate fuel from the wet-fouled spark plugs faster than airflow from the evaporative emissions system. However, each airflow source (e.g., the electric boosting device and evaporative emissions system) consumes energy, such as from the system battery. Furthermore, the hot air provided by the evaporative emissions system flows through a fuel vapor storage canister of the evaporative emissions system. As a result, the fuel vapor storage canister is purged, with fuel vapors desorbed from adsorbent in the fuel vapor storage canister and routed to the engine. It may be unfavorable to purge the fuel vapor storage canister while combustion is not occurring, as unburnt fuel vapors may increase vehicle evaporative emissions. For example, the emission control device may be below its light-off temperature prior to engine start. Further still, the desorbed fuel vapors may increase the humidity of the hot air, which may decrease an efficiency of drying the wet-fouled spark plugs compared to when the hot air contains no desorbed fuel vapors. Therefore, at 314, it is determined if a load of the fuel vapor storage canister (e.g., an amount of fuel vapors stored in the fuel vapor storage canister) is less than a threshold load. For example, the threshold load may correspond to a non-zero amount of adsorbed fuel vapors below which increased vehicle evaporative emissions due to purging while the engine is off and/or increased humidity due to desorbed fuel vapors may be negligible. The threshold load may be a pre-calibrated amount that may vary based on a size of the fuel vapor storage canister, for example.

If the load of the fuel vapor storage canister is less than the threshold load, method 300 proceeds to 316 and includes drying the wet-fouled spark plugs via airflow from one of the evaporative emissions system (as will be described with respect to FIG. 4) and the electric boosting device (as will be described with respect to FIG. 5) based on a relative energy consumption of the two airflow sources. The relative energy consumption may refer to an amount of energy expected to be consumed by the evaporative emissions system relative to an amount of energy expected to be consumed by the electric boosting device when used to provide airflow for spark plug drying. The amount of energy expected to be consumed by the evaporative emissions system may include energy consumed by actuating valve(s) to couple the engine to atmosphere via the evaporative emissions system (e.g., a CPV, a CVV, a throttle, and/or a FTIV, as further described below), actuating the canister heating element, and actuating the pump over a duration of the drying. The amount of energy expected to be consumed by the evaporative emissions system may be a pre-calibrated value stored in a memory of the controller. As one example, a lookup table stored in a memory of the controller may include a series of pre-calibrated values referenced against ambient temperature. Therefore, the controller may input the ambient temperature into the lookup table and output the amount of energy expected to be consumed by drying via the evaporative emissions system. Additionally or alternatively, the stored value may be adjusted based on prior executions of spark plug drying via the evaporative emissions system, such as by integrating an amount of current consumed during the drying, which may be further adjusted based on the ambient temperature (e.g., the amount of energy expected to be consumed may decrease as the ambient temperature increases). Similarly, the amount of energy expected to be consumed by the electric boosting device may include energy consumed by actuating valve(s) (e.g., a ESBV and/or the throttle, as further described below) and actuating the electric motor of the electric boosting device over a duration of the drying, which may be a different (e.g., shorter) duration than the duration for the evaporative emissions system. The amount of energy expected to be consumed by the electric boosting device may be a pre-calibrated value stored in a memory of the controller. As one example, a lookup table stored in a memory of the controller may include a series of pre-calibrated values referenced against ambient temperature. Therefore, the controller may input the ambient temperature into the lookup table and output the amount of energy expected to be consumed by drying via the electric boosting device. Additionally or alternatively, the stored value may be adjusted based on prior executions of spark plug drying via airflow provided by the electric boosting device, such as by integrating an amount of current consumed during the drying, which may be further adjusted based on the ambient temperature. The controller may compare the amount of energy expected to be consumed by the evaporative emissions system with the amount of energy expected by be consumed by the electric boosting device and select the airflow source with the smallest energy consumption value. In an alternative example, if the vehicle is a plug-in hybrid electric vehicle (PHEV) that is plugged in and receiving energy from a power grid, then the electric boosting device may be selected even if the relative amount of energy expected to be consumed is higher because airflow provided by the electric boosting device may dry the spark plugs more quickly.

Returning to 314, if the load of the fuel vapor storage canister is not less than the threshold (e.g., the load is greater than or equal to the threshold), or if a pump is not included in the evaporative emissions system, method 300 proceeds to 318 and includes drying the wet-fouled spark plugs via airflow from the electric boosting device, as will be described with respect to FIG. 5. In this way, when the engine system includes both airflow sources, the evaporative emissions system may not be selected when the fuel vapor storage canister is greater than the threshold load even if drying the wet-fouled spark plugs via hot air from the evaporative emissions system would be more energy efficient.

Whether the spark plugs are dried via airflow provided by the evaporative emissions system or the electric boosting device, at 320, method 300 includes adjusting the intake and exhaust valve operation to decrease PVO. For example, the intake and exhaust valve timing may be reverted to a nominal valve timing for an engine start event, such as by undoing adjustments made at 313. For example, if the intake valve timing was advanced via a VCT or CPS system at 313, the controller may retard the intake valve timing by a corresponding amount. Similarly, if the exhaust valve timing was retarded via the VCT of CPS system at 313, the controller may advance the exhaust valve timing by a corresponding amount. As another example, if the duration of opening of the intake and/or the exhaust valve was extended via a CPS system at 313, the cam profile may be returned to the starting cam profile before the duration of opening was extended. As still another example, when the valve actuators are of the electric valve actuation type, the controller may return the signals provided to the valve actuators to nominal signals provided during an engine start event.

At 322, method 300 includes enabling fuel delivery and spark. Enabling fuel delivery and spark may include actuating a fuel pump (e.g., fuel pump 234 of FIG. 2) to provide fuel to fuel injectors at a high pressure. However, the fuel injectors may not yet be actuated open. In this way, fuel may be readied for injection in response to an engine start request, such as an engine start request from the vehicle operator. Similarly, enabling spark may include enabling a spark advance signal to be transmitted from the controller to an ignition system (e.g., ignition system 190 of FIG. 1) in anticipation of the engine start request but not yet transmitting the signal. By enabling fuel delivery and spark, combustion may be initiated in the engine cylinders in response to the engine start request.

At 324, method 300 optionally includes notifying the vehicle operator that an engine start may be attempted. For example, a message may be displayed to the vehicle operator, such as on the human-machine interface on the dash of the vehicle, stating that the engine start may be attempted. Following 324, method 300 ends.

Figure 4:
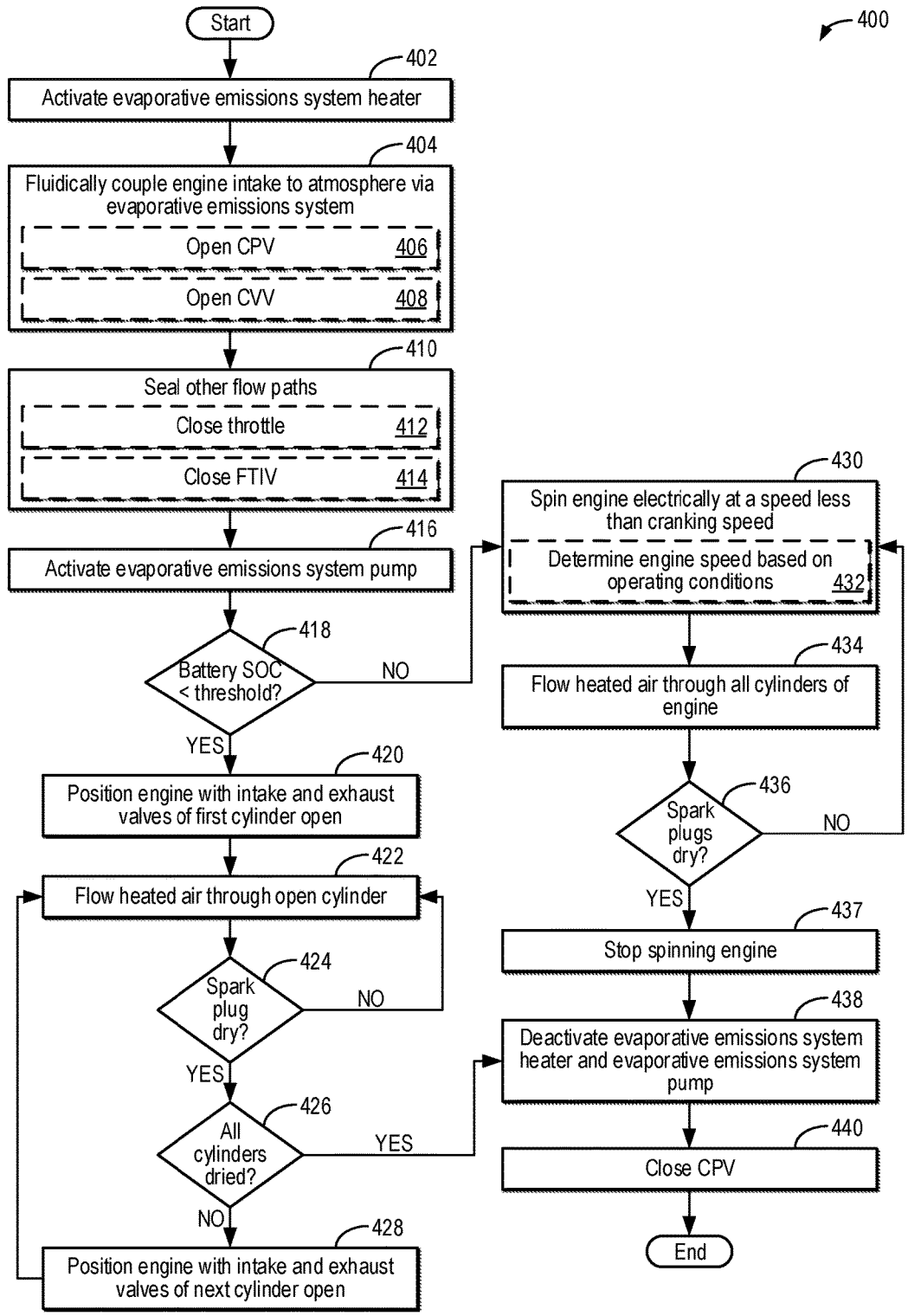
FIG. 4 shows an example method for drying wet-fouled spark plugs with heated air provided by an evaporative emissions system.

Continuing to FIG. 4, an example method 400 is shown for drying wet-fouled spark plugs in an engine system via airflow provided by an evaporative emissions system (e.g., evaporative emissions system 219 of FIG. 2). For example, fresh air may be drawn into the evaporative emissions system via a pump (e.g., pump 238 of FIG. 2), where it may be heated by a heater included in the evaporative emissions system. From the evaporative emissions system, the heated air may be flowed to an intake of the engine (e.g., intake manifold 146 of FIGS. 1 and 2) and through one or more cylinders of the engine, thereby evaporating fuel from the wet-fouled spark plugs to dry them. As will be described below, the wet-fouled spark plugs may be dried one at a time (e.g., cylinder by cylinder, by indexing the engine) or simultaneously (e.g., by continuously rotating the engine). Method 400 may be performed as a part of method 300 of FIG. 3 (e.g., at 316). Alternatively, method 400 may be performed responsive to any indication of spark plug wet-fouling, particularly if an electric boosting device is not included in the engine system.

Method 400 begins at 402 and includes activating the evaporative emissions system heater. As described with respect to FIG. 2, the evaporative emissions system heater may be a canister heating element (e.g., canister heating element 216 of FIG. 2) coupled to and/or within a fuel vapor storage canister of the evaporative emissions system (e.g., fuel vapor storage canister 222 of FIG. 2). Activating the canister heating element may include supplying electrical power to the canister heating element so that the canister heating element generates heat, which can then be transferred to the fuel vapor storage canister, including adsorbent within the fuel vapor storage canister, and/or ambient air. The amount of electrical power supplied to the canister heating element may be modulated based on a temperature of the fuel vapor storage canister, such as measured by a temperature sensor (e.g., temperature sensor 215 of FIG. 2). For example, a relatively high amount (or duty cycle) of electrical power may be supplied to the canister heating element initially in order to quickly increase the temperature of the fuel vapor storage canister to a desired temperature (e.g., 150° F.). Then, once the fuel vapor storage canister reaches the desired temperature, the amount (or duty cycle) of electrical power supplied to the canister heating element may be decreased in order to maintain the temperature of the fuel vapor storage canister at the desired temperature. For example, the controller may input the temperature of the fuel vapor storage canister, ambient temperature, and the mass of the fuel vapor storage canister into a look-up table or function and output the amount (or duty cycle) of electrical power to supply to the canister heating element. For example, voltage may be supplied by a system battery of the vehicle (e.g., system battery 58 of FIGS. 1 and 2). Further, the desired temperature may be a predetermined temperature value or may be determined based on vehicle operating conditions, such as the ambient temperature and ambient humidity. For example, the controller may input the ambient temperature (e.g., as measured by an ambient temperature sensor, such as temperature sensor 255 of FIG. 2) and ambient pressure (e.g., as measured by pressure sensor 259 of FIG. 2) into a look-up table and output the desired temperature.

At 404, method 400 includes fluidically coupling the engine intake to atmosphere via the evaporative emissions system, such as by adjusting one or more valves of the evaporative emissions system. For example, fluidically coupling the engine intake to the atmosphere via the evaporative emissions system may include opening a CPV of the evaporative emissions system (e.g., CPV 212 of FIG. 2), as indicated at 406. As described with respect to FIG. 2, the CPV may be a normally closed valve included in a purge line coupling the engine intake to the evaporative emissions system. Therefore, if closed, the CPV may be commanded open to couple the evaporative emissions system to the engine intake. Fluidically coupling the engine intake to the atmosphere via the evaporative emissions system may further include opening a CVV (e.g., CVV 214 of FIG. 2), as indicated at 408. As described with respect to FIG. 2, the CVV may be a normally open valve included in a vent that couples the evaporative emissions system to the atmosphere. Therefore, if open, the CVV may be maintained open, and if not open, the CVV may be commanded open to couple the evaporative emissions system to the atmosphere. With both the CVV and the CPV open, the engine intake may be coupled to the atmosphere via the evaporative emissions system.

At 410, method 400 includes sealing other flow paths. Sealing other flow paths may include closing a throttle (e.g., throttle 162 of FIGS. 1 and 2), as indicated at 412. By closing the throttle, fuel vapors from the evaporative emissions system may not be routed to the atmosphere through the throttle. Further, with the throttle closed, heated air from the evaporative emissions system may be routed from the engine intake to the engine and not through the throttle to the atmosphere. Sealing other flow paths may further include closing a FTIV coupled between the evaporative emissions system and fuel system (e.g., FTIV 236 of FIG. 2), as indicated at 414. As described with respect to FIG. 2, the FTIV may be a normally closed valve. Therefore, if closed, the FTIV may be maintained closed, and if open, the FTIV may be commanded closed. By closing (or maintaining closed) the FTIV, fuel vapors may not flow from the fuel system to the engine intake via the evaporative emissions system, and heated air may not flow from the evaporative emissions system to the fuel tank. Sealing other flow paths may further include sealing any fluidic couplings to the crankcase ventilation system, EGR, etc.

At 416, method 400 includes activating the evaporative emissions system pump. For example, the evaporative emissions system pump may be activated in a positive pressure mode so that the evaporative emissions system pump draws fresh air into the evaporative emissions system through the vent and the open CVV. Activating the evaporative emissions system pump may include supplying electrical power to the evaporative emissions system pump, with the amount of electrical power supplied to the evaporative emissions system pump determined based on a desired flowrate. For example, the controller may input the desired flowrate into a look-up table and output an amount (or duty cycle) of electrical power to supply to the evaporative emissions system pump. Further, the desired flowrate may be a predetermined flowrate value or may be determined based on vehicle operating conditions, such as ambient temperature and ambient humidity. For example, the controller may input the ambient temperature and ambient pressure into a look-up table and output the desired flowrate. The air drawn in by the evaporative emissions system pump may be heated by the canister heating element and the hot fuel vapor storage canister before being routed to the engine intake via the open CPV and the purge line.

At 418, it is determined if the system battery SOC is less than a threshold. The threshold may be a non-zero amount of charge, such as a percentage of a total charge capacity, below which the battery may not be able to support or execute additional vehicle functions upon starting (e.g., vehicle cabin heating and cooling) if a more energy consuming method of wet-fouled spark plug drying is used. For example, drying the spark plugs simultaneously by continuously spinning the engine, as described further below, may be quicker but may consume more energy than by indexing the engine to dry the spark plugs one at a time, as will also be described below. Therefore, drying the spark plugs simultaneously by continuously spinning the engine may be preferred in order to reduce an amount of time until the engine can be started if sufficient energy is available (e.g., the system battery SOC is not less than the threshold or the vehicle is a PHEV receiving energy from a power grid). The threshold may be a pre-calibrated value stored in a non-volatile memory of the controller that may be further adjusted based on an average amount of electrical energy consumed while drying the wet-fouled spark plugs by continuously spinning the engine, which may be a sum of an amount of energy consumed by the canister heating element, an amount of energy consumed by the evaporative emissions system pump, and an amount of energy consumed through continuously rotating the engine (such as determined by integrating current, for example). In an alternative example, continuously spinning the engine may be expected to consume less energy than indexing the engine due to continuously spinning the engine drying the spark plugs more quickly.

If the system battery SOC is less than the threshold, method 400 proceeds to 420 and includes positioning the engine with intake and exhaust valves of a first cylinder open. For example, the engine may be rotated to an engine position (e.g., in crank angle degrees) in which the intake and exhaust valves of the first cylinder are open. The engine may be rotated by a starter motor or, if the engine is included in a hybrid vehicle, an electric machine (e.g., electric machine 52 of FIG. 1). Further, the engine may be positioned to minimize an available volume within the first cylinder, such as when the piston within the first cylinder is at or near TDC. As described above with respect to 313 of FIG. 3, PVO may also be maximized at or near TDC near the end of the exhaust stroke. Therefore, the engine may be positioned with the first cylinder at or near the end of its exhaust stroke. Once the engine is positioned, the starter motor or the electric machine may be deactivated, and the engine may be at rest.

At 422, method 400 includes flowing heated air through the open cylinder. For example, the heated air delivered to the engine intake from the evaporative emissions system may be flowed through the open intake valve(s) of the cylinder, through the cylinder and across the wet-fouled spark plug coupled thereto, and through the open exhaust valve(s) to an exhaust manifold and on to an emission control device. By minimizing the available volume within the cylinder (e.g., at 420), the heated air flowing through the cylinder may deliver its thermal energy and fluid convective effect through a smaller cavity, enhancing a rate of fuel evaporation from the surface of the wet-fouled spark plug. The heated air (e.g., gas) may include one or more of fresh air and fuel vapors that have been heated by the evaporative emissions system heater.

At 424, it is determined if the spark plug is dry. As one example, it may be determined that the spark plug is dry if the heated air has been flowed through the open cylinder for a first threshold duration. The first threshold duration may be a non-zero predetermined duration predicted to dry even a severely wet-fouled spark plug via heated air from the evaporative emissions system while the engine is at rest. Alternatively, it may be determined that the spark plug is dry by actuating the spark plug in the absence of fueling and monitoring a secondary ignition circuit of a coil of the spark plug. Based on a resulting waveform, the controller may determine whether actuating the spark plug has resulted in a spark or not.

If the spark plug is not dry (e.g., the first threshold duration has not been reached or actuating the spark plug has not produced a spark), method 400 returns to 422 to continue flowing the heated air through the open cylinder. For example, the engine will not be rotated and will remain in its current position while air continues to be drawn into the evaporative emissions system by the evaporative emissions system pump, heated by the heater, and flowed through the (first) open cylinder. In this way, the spark plug will continue to be dried.

If the spark plug is dry (e.g., the first threshold duration has been reached), method 400 proceeds to 426 to determine if all of the cylinders have been dried. For example, it may be determined that all of the cylinders have been dried if the engine has been indexed to flow the heated air through each of the cylinders one-by-one until every spark plug is dry. If the heated air has not been flowed through one or more cylinders, it may be determined that all of the cylinders have not been dried.

If all of the cylinders have not been dried, method 400 proceeds to 428 and includes positioning the engine with the intake and exhaust valves of the next cylinder open. For example, the engine may be rotated (via the starter motor or the electric machine) to an engine position in which the intake and exhaust valves of the next cylinder are open and an available volume within the cylinder is minimized, as described above at 420. Therefore, the engine may be positioned with the next cylinder at or near the end of its exhaust stroke. For example, the engine may be rotated from a first engine position in which the intake and exhaust valves of the first cylinder are open to a second engine position in which the intake and exhaust valves of a second cylinder are open. Method 400 may then return to 422 to flow heated air through the open cylinder (e.g., the second cylinder). After the spark plug of the second cylinder is determined to be dry (e.g., at 424), the engine may be rotated from the second engine position to a third engine position in which the intake and exhaust valves of a third cylinder are open, etc. In this way, the engine may be indexed to flow heated air through a selected cylinder until the spark plugs of every cylinder have been dried.

If all of the cylinders have been dried at 426, method 400 proceeds to 438 and includes deactivating the evaporative emissions system heater and the evaporative emissions system pump. Deactivating the evaporative emissions system heater may include stopping the supply of electrical power to the heater (e.g., the canister heating element), for example. Similarly, deactivating the evaporative emissions system pump may include stopping the supply of electrical power to the evaporative emissions system pump.

At 440, method 400 includes closing the CPV. For example, the CPV may be actuated to a fully closed position to isolate the engine intake from the evaporative emissions system. By closing the CPV, air and fuel vapors will not be drawn into the engine intake from the evaporative emissions system upon engine start. Further, the CVV may be maintained open, keeping the evaporative emissions system coupled to the atmosphere. Following 440, method 400 ends. Additionally, if method 400 is performed as a part of method 300 of FIG. 3 (e.g., at 316), method 300 may proceed (e.g., to 320), for example.

Returning to 418, if the battery SOC is not less than the threshold (e.g., the battery SOC is greater than or equal to the threshold), method 400 proceeds to 430 and includes spinning the engine electrically at a speed less than cranking speed. Alternatively, method 400 may proceed to 430 if continuously spinning the engine is expected to consume less energy than indexing the engine to dry the wet-fouled spark plugs. For example, the engine may be continuously rotated using the starter motor (if the engine is included in a conventional vehicle wherein the engine is the only source of torque) or the electric machine (if the engine is included in a hybrid vehicle). In some examples, the controller may determine the engine speed based on operating conditions, such as ambient humidity and temperature, as indicated at 432. For example, the controller may input the operating conditions (e.g., the ambient temperature and the ambient humidity) into a look-up table, map, or algorithm and output a corresponding engine speed for drying the wet-fouled spark plugs under the given operating conditions, then determine a motor speed of the starter motor or electric machine that will provide the determined engine speed, such as via a look-up table, map, or algorithm. In another example, the engine speed is independent of the operating conditions. The controller may adjust a duty cycle of non-zero voltage supplied to the starter motor or the electric machine to operate the starter motor or the electric machine at the determined motor speed that will provide the determined engine speed, for example.

At 434, method 400 includes flowing heated air through all of the cylinders of the engine. As the engine is rotated, the heated air is drawn into each cylinder during its intake stroke and pushed out of each cylinder during its exhaust stroke. Further, with the increased positive valve overlap (e.g., as increased at 313 of FIG. 3), a portion of the heated air may flow through each cylinder and to the exhaust manifold while both the intake and exhaust valves of the corresponding cylinder are open. The heated air, whether contained within a cylinder during an engine cycle or flowed through, evaporates fuel from the wet-fouled spark plug coupled therein and carries the evaporated fuel to the exhaust manifold and on to the emission control device.

At 436, it is determined if the spark plugs are dry. As one example, it may be determined that the spark plugs are dry if the engine has been rotated with the heated air flowing through all of the cylinders of the engine for a second threshold duration. The second threshold duration may be a non-zero predetermined duration predicted to dry even severely wet-fouled spark plugs using by flowing the heated air through the engine cylinders while continuously rotating the engine. The second threshold duration may be greater than the first threshold duration at 424, for example. Alternatively, it may be determined that each spark plug is dry by actuating each spark plug in the absence of fueling and monitoring a secondary ignition circuit of a coil of each spark plug. Based on a resulting waveform, the controller may determine whether actuating each spark plug has resulted in a spark or not. If the spark plugs are not dry (e.g., a duration of drying is less than the second threshold duration or at least one of the spark plugs has not produced a spark when actuated), method 400 returns to 430 to continue spinning the engine electrically at the speed that is less than cranking speed. For example, the heated air may be provided to the electrically rotated engine until the second threshold duration is reached.

If the spark plugs are dry (e.g., the second threshold duration is reached or each spark plug produces a spark when actuated), method 400 proceeds to 437 and includes stopping spinning the engine. For example, the starter motor or the electric machine may be deactivated, such as by stopping the supply of voltage to the starter motor or the electric machine, so that the motor speed and the engine speed both decrease to zero. As another example, when the electric machine is being used to spin the engine electrically, stopping spinning the engine may include decoupling the engine from the electric machine, such as by disengaging a clutch connecting the electric machine to the crankshaft of the engine (e.g., first clutch 56 of FIG. 1). Method 400 may proceed to 438, as described above. In this way, the spark plugs of every cylinder may be dried simultaneously by flowing heated air from the evaporative emissions system through every engine cylinder as the engine is electrically rotated.

Figure 5:
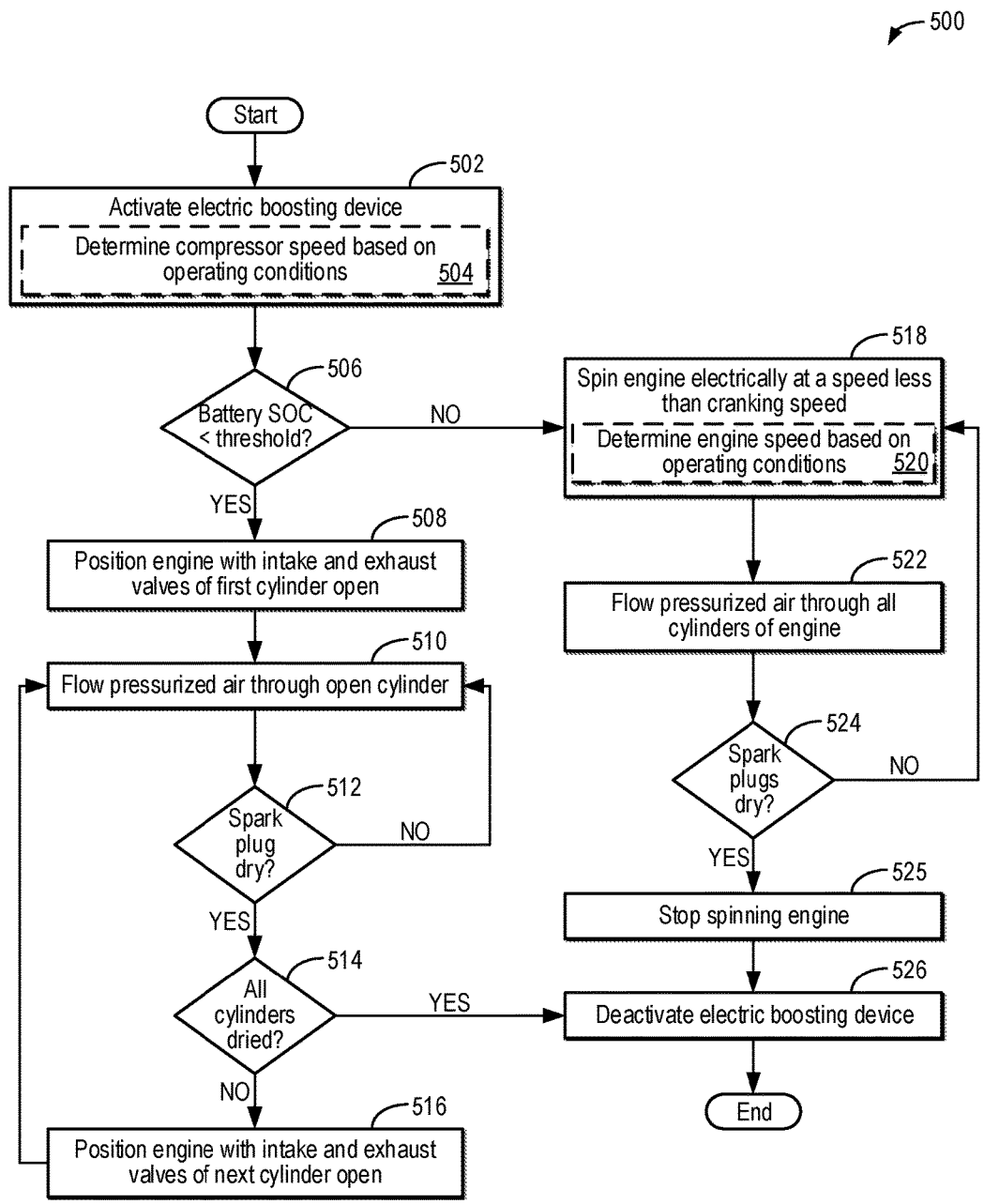
FIG. 5 shows an example method for drying wet-fouled spark plugs with pressurized air provided by an electric boosting device.

Next, FIG. 5 shows an example method 500 for drying wet-fouled spark plugs in an engine system via airflow provided by an electric boosting device (e.g., electric supercharger 13 of FIG. 2). For example, the electric boosting device may provide on-demand pressurized air to dry the wet-fouled spark plugs while they remain in the engine system. For example, intake air may be drawn into an intake passage (e.g., intake passage 142 of FIGS. 1 and 2), pressurized by the electric boosting device, flowed to an intake of the engine (e.g., intake manifold 146 of FIGS. 1 and 2), and then through one or more cylinders of the engine, thereby evaporating fuel from the wet-fouled spark plugs to dry them. As will be described below, the wet-fouled spark plugs may be dried one at a time (e.g., cylinder by cylinder, by indexing the engine) or simultaneously (e.g., by continuously rotating the engine). Method 500 may be performed as a part of method 300 of FIG. 3 (e.g., at 316 and 318). Alternatively, method 500 may be performed by a controller (e.g., controller 12 of FIGS. 1 and 2) responsive to any indication of spark plug wet-fouling.

Method 500 begins at 502 and includes activating the electric boosting device. As described with respect to FIG. 2, the electric boosting device may be an electric supercharger, although any electrically assisted boosting device may be used, such as an electrically assisted turbocharger. The electric boosting device may include a compressor (e.g., first compressor 111 of FIG. 2) and an electric motor (e.g., electric motor 107 of FIG. 2), the electric motor driving the compressor via a compressor shaft (e.g., supercharger compressor shaft 80). As an example, activating the electric boosting device may include determining a compressor speed of the compressor that will provide a desired boost pressure and then determining a motor speed of the electric motor that will provide the determined compressor speed. In some examples, the compressor speed may be determined based on operating conditions, such as ambient temperature and ambient humidity, as indicated at 504. For example, the controller may input the operating conditions (e.g., the ambient temperature and the ambient humidity) into a look-up table, map, or algorithm and output a desired boost pressure for drying the wet-fouled spark plugs under the given operating conditions, then determine the compressor speed that will provide the desired boost pressure, such as via a look-up table, map, or algorithm. In another example, the desired boost pressure and the compressor speed are independent of the operating conditions. The controller may adjust a duty cycle of non-zero voltage supplied to the electric motor to operate the electric motor at the determined motor speed that will provide the determined compressor speed. For example, voltage may be supplied by a system battery of the vehicle (e.g., system battery 58 of FIGS. 1 and 2). In some examples, activating the electric boosting device may further include fully closing a bypass valve (e.g., ESBV 72 of FIG. 2) so that all of the intake air is directed through the compressor of the electric boosting device, such as via a bypass passage (e.g., first compressor bypass passage 70 of FIG. 2).

At 506, it is determined if a state of charge of the battery is less than a threshold. The threshold may be a non-zero amount of charge, such as a percentage of a total charge capacity, below which the battery may not be able to support or execute additional vehicle functions upon starting (e.g., vehicle cabin heating and cooling) if a more energy consuming method of wet-fouled spark plug drying is used. For example, as described with respect to FIG. 4 (e.g., at 418) drying the spark plugs simultaneously by continuously spinning the engine may be quicker but may consume more energy than by indexing the engine to dry the spark plugs one at a time. Therefore, drying the spark plugs simultaneously by continuously spinning the engine may be preferred in order to reduce an amount of time until the engine can be started if sufficient energy is available (e.g., the battery SOC is not less than the threshold or the vehicle is a PHEV receiving energy from a power grid). The threshold may be a pre-calibrated value stored in a non-volatile memory of the controller that may be further adjusted based on an average amount of electrical energy consumed while drying the wet-fouled spark plugs by continuously spinning the engine, which may be a sum of an amount of energy consumed by the electric boosting device and an amount of energy consumed through continuously rotating the engine (such as determined by integrating current, for example). In an alternative example, continuously spinning the engine may be expected to consume less energy than indexing the engine due to continuously spinning the engine drying the spark plugs more quickly.

If the battery SOC is less than the threshold, method 500 proceeds to 508 and includes positioning the engine with intake and exhaust valves of a first cylinder open. For example, the engine may be rotated to an engine position (e.g., in crank angle degrees) in which the intake and exhaust valves of the first cylinder are open. The engine may be rotated by a starter motor or, if the engine is included in a hybrid vehicle, an electric machine (e.g., electric machine 52 of FIG. 1). Further, the engine may be positioned to minimize an available volume within the cylinder, such as when the piston within the cylinder is at or near TDC. As described above (e.g., at 313 of FIG. 3), PVO may also be maximized at or near TDC near the end of the exhaust stroke. Therefore, the engine may be positioned with the first cylinder at or near the end of its exhaust stroke.

At 510, method 500 includes flowing pressurized air through the open cylinder. For example, the air drawn in from the atmosphere through the intake passage and compressed by the compressor of the electric boosting device may be flowed through the open intake valve(s) of the cylinder, through the cylinder and across the wet-fouled spark plug coupled thereto, and through the open exhaust valve(s) to an exhaust manifold and on to an emission control device. By minimizing the available volume within the cylinder (e.g., at 508), the pressurized air may flow through the cylinder more quickly, enhancing a rate of fuel evaporation from the surface of the wet-fouled spark plug. Further, a throttle coupled to the intake passage (e.g., throttle 162 of FIGS. 1 and 2) may be commanded to a fully open position to increase a flow rate and/or pressure of intake air provided to the cylinder.

At 512, it is determined if the spark plug is dry. As one example, it may be determined that the spark plug is dry if the pressurized air has been flowed through the open cylinder for a third threshold duration. The third threshold duration may be a non-zero predetermined duration predicted to dry even a severely wet-fouled spark plug via pressurized air from the electric boosting device while the engine is at rest. Alternatively, it may be determined that the spark plug is dry by actuating the spark plug in the absence of fueling and monitoring a secondary ignition circuit of a coil of the spark plug. Based on a resulting waveform, the controller may determine whether actuating the spark plug has resulted in a spark or not.

If the spark plug is not dry, method 500 returns to 510 to continue flowing the pressurized air through the open cylinder. For example, the pressurized air may be provided to the open cylinder (e.g., the first cylinder) until the third threshold duration is reached. If the spark plug is dry (e.g., the third threshold duration has been reached), method 500 proceeds to 514 to determine if all of the cylinders have been dried. For example, it may be determined that all of the cylinders have been dried if the engine has been indexed to flow the pressurized air through each of the cylinders one-by-one until every spark plug is dry. If the pressurized air has not been flowed through one or more cylinders, it may be determined that all of the cylinders have not been dried.

If all of the cylinders have not been dried, method 500 proceeds to 516 and includes positioning the engine with intake and exhaust valves of the next cylinder open. For example, the engine may be rotated (via the starter motor or the electric machine) to an engine position in which the intake and exhaust valves of the next cylinder are open and an available volume within the cylinder is minimized, as described above at 508. Therefore, the engine may be positioned with the next cylinder at or near the end of its exhaust stroke. For example, the engine may be rotated from a first engine position in which the intake and exhaust valves of the first cylinder are open to a second engine position in which the intake and exhaust valves of a second cylinder are open. Method 500 may then return to 510 to flow pressurized air through the open cylinder (e.g., the second cylinder). After the spark plug of the second cylinder is determined to be dry (e.g., at 512), the engine may be rotated from the second engine position to a third engine position in which the intake and exhaust valves of a third cylinder are open, etc. In this way, the engine may be indexed to flow heated air through a selected cylinder until the spark plugs of every cylinder have been dried.

If all of the cylinders have been dried at 514, method 500 proceeds to 526 and includes deactivating the electric boosting device. Deactivating the electric boosting device may include stopping the supply of electrical power to the electric motor of the electric boosting device, for example. In some examples, deactivating the electric boosting device may also include at least partially opening the bypass valve so that intake air may bypass the electric boosting device and flow to the engine intake without flowing through the compressor of the electric boosting device. Following 526, method 500 ends.

Returning to 506, if the battery SOC is not less than the threshold (e.g., the battery SOC is greater than or equal to the threshold), method 500 proceeds to 518 and includes spinning the engine electrically at a speed that is less than cranking speed. Alternatively, method 500 may proceed to 518 if continuously spinning the engine is expected to consume less energy than indexing the engine to dry the wet-fouled spark plugs. For example, the engine may be continuously rotated via the starter motor (if the engine is included in a conventional vehicle wherein the engine is the only source of torque) or the electric machine (if the engine is included in a hybrid vehicle). In some examples, the controller may determine the engine speed based on operating conditions, such as ambient humidity and temperature, as indicated at 520. For example, the controller may input the operating conditions (e.g., the ambient temperature and the ambient humidity) into a look-up table, map, or algorithm and output a corresponding engine speed for drying the wet-fouled spark plugs under the given operating conditions, then determine a motor speed of the starter motor or electric machine that will provide the determined engine speed, such as via a look-up table, map, or algorithm. In another example, the engine speed is independent of the operating conditions. The controller may adjust a duty cycle of non-zero voltage supplied to the starter motor or electric machine to operate the starter motor or electric machine at the determined motor speed that will provide the determined engine speed, for example.

At 522, method 500 includes flowing the pressurized air through all of the cylinders of the engine. Flowing the pressurized air through all of the cylinders of the engine may include actuating the throttle to the fully open position to increase the flow rate and/or pressure of intake air provided to the cylinders. As the engine is rotated, the pressurized air is drawn into each cylinder during its intake stroke and pushed out of each cylinder during its exhaust stroke. Further, with the increased positive valve overlap, a portion of the pressurized air may flow through each cylinder and to the exhaust manifold while both the intake and exhaust valves of the corresponding cylinder are open. The pressurized air, whether contained within a cylinder during an engine cycle or flowed through, evaporates fuel from the wet-fouled spark plug coupled therein and carries the evaporated fuel to the exhaust manifold and onto the emission control device.

At 524, it is determined if the spark plugs are dry. As one example, it may be determined that the spark plugs are dry if the engine has been rotated with the pressurized air flowing through all of the cylinders of the engine for a fourth threshold duration. The fourth threshold duration may be a non-zero predetermined duration predicted to dry even severely wet-fouled spark plugs by providing pressurized air from the electric boosting device while continuously rotating the engine. The fourth threshold duration may be greater than the third threshold duration at 512 and may be different than or the same as the second threshold duration of method 400 of FIG. 4 (e.g., at 436), for example. Alternatively, it may be determined that each spark plug is dry by actuating each spark plug in the absence of fueling and monitoring a secondary ignition circuit of a coil of each spark plug. Based on a resulting waveform, the controller may determine whether actuating each spark plug has resulted in a spark or not. If the spark plugs are not dry (e.g., a duration of drying is less than the fourth threshold duration or at least one of the spark plugs has not produced a spark when actuated), method 500 returns to 518 to continue spinning the engine electrically at the speed that is less than cranking speed. For example, the pressurized air may be provided to the electrically rotated engine until the fourth threshold duration is reached.

If the spark plugs are dry (e.g., the fourth threshold duration is reached or each spark plug produces a spark when actuated), method 500 proceeds to 525 and includes stopping spinning the engine. For example, the starter motor or electric machine may be deactivated, such as by stopping the supply of voltage to the starter motor or electric machine, so that the motor speed and the engine speed decrease to zero. As another example, when the electric machine is being used to spin the engine electrically, stopping spinning the engine may include decoupling the engine from the electric machine, such as by disengaging a clutch connecting the electric machine to the crankshaft of the engine (e.g., first clutch 56 of FIG. 1). Method 500 may then proceed to 526, as described above. In this way, the spark plugs of every cylinder may be dried simultaneously by flowing pressurized air from the electric boosting device through every engine cylinder as the engine is electrically rotated.

Together, the methods of FIGS. 3-5 provide a method for detecting spark plug wet-fouling in an engine system and operating during the wet-fouling, such as by selecting from among each of a first mode, a second mode, a third mode, and a fourth mode based on operating conditions. As an example, during the first mode, the method may include flowing a heated gas through a selected engine cylinder and to an emission control device while the engine is at rest; during the second mode, the method may include flowing the heated gas through every engine cylinder and to the emission control device while the engine is spun electrically; during the third mode, the method may include flowing a compressed gas through the selected engine cylinder and to the emission control device while the engine is at rest; and during the fourth mode, the method may include flowing the compressed gas through every engine cylinder and to the emission control device while the engine is spun electrically. For example, the heated gas may include at least one of fresh air and fuel vapors that has been heated by a heater of an evaporative emissions system coupled to an intake of the engine, and the compressed gas may include intake air that has been compressed (e.g., pressurized) by an electric boosting device coupled to the engine intake. Selecting from among each of the first mode, the second mode, the third mode, and the fourth mode may include selecting the first mode in a first condition, selecting the second mode in a second condition, selecting the third mode in a third condition, and selecting the fourth mode in the fourth condition. As an example, the first condition may include a load of a fuel vapor storage canister of the evaporative emissions system being less than a threshold load and a state of charge of a system battery being less than a threshold state of charge; the second condition may include the load of the fuel vapor storage canister being less than the threshold load and the state of charge of the system battery being greater than or equal to the threshold state of charge; the third condition may include the load of the fuel vapor storage canister being greater than or equal to the threshold load and the state of charge of the system battery being less than the threshold state of charge; and the fourth condition may include the load of the fuel vapor storage canister being greater than or equal to the threshold load and the state of charge of the system battery being greater than or equal to the threshold state of charge.

As a first example, the method may include the first condition occurring, determining the first condition based on the load of the fuel vapor storage canister and the state of charge of the system battery, selecting the first mode in response thereto, and operating in the first mode. Operating in the first mode may include coupling an intake of the engine to atmosphere via the evaporative emissions system, activating the heater of the evaporative emissions system, and activating a pump of the evaporative emissions system to draw fresh air into the evaporative emissions system from the atmosphere. For example, coupling the intake of the engine to the atmosphere via the evaporative emissions system may include fully opening a canister purge valve, fully opening or maintaining open a canister vent valve, fully closing or maintaining closed a fuel tank isolation valve, and fully closing a throttle valve coupled to the engine intake. As an example, the heater may be a canister heating element coupled to the fuel vapor storage canister, and activating the heater may include supplying non-zero voltage to the canister heating element. Similarly, activating the pump of the evaporative emissions system may include supplying non-zero voltage to the pump and operating the pump in a positive pressure mode. Operating in the first mode may further include adjusting cylinder intake valve and exhaust valve timing to increase an amount of positive valve overlap and rotating the engine to a position in which the intake and exhaust valves of the selected cylinder are open. As an example, the cylinder may be selected based on which cylinder(s) have already been positioned with their intake and exhaust valves open and which have not.

As a second example, the method may include the second condition occurring, determining the second condition based on the load of the fuel vapor storage canister and the state of charge of the system battery, selecting the second mode in response thereto, and operating in the second mode. Operating in the second mode may include coupling the intake of the engine to the atmosphere via the evaporative emissions system, activating the heater of the evaporative emissions system, and activating the pump of the evaporative emissions system to draw fresh air into the evaporative emissions system from the atmosphere. For example, coupling the intake of the engine to the atmosphere via the evaporative emissions system may include fully opening the canister purge valve, fully opening or maintaining open the canister vent valve, fully closing or maintaining closed the fuel tank isolation valve, and fully closing the throttle valve coupled to the engine intake. As an example, the heater may be the canister heating element coupled to the fuel vapor storage canister, and activating the heater may include supplying non-zero voltage to the canister heating element. Similarly, activating the pump of the evaporative emissions system may include supplying non-zero voltage to the pump and operating the pump in the positive pressure mode. Operating in the second mode may further include adjusting the cylinder intake valve and exhaust valve timing to increase the amount of positive valve overlap and rotating the engine at a target speed via an electric starter motor or an electric machine. The target speed may be determined based on operating conditions, such as ambient temperature and ambient humidity, for example.

As a third example, the method may include the third condition occurring, determining the third condition based on the load of the fuel vapor storage canister and the state of charge of the system battery, selecting the third mode in response thereto, and operating in the third mode. Operating in the third mode may include providing the compressed air to the engine via the electric boosting device. For example, providing the compressed air to the engine via the electric boosting device may include operating a compressor of the electric boosting device at a target compressor speed, the target compressor speed determined based on operating conditions (e.g., ambient temperature and ambient humidity). Operating the compressor of the electric boosting device at the target compressor speed may include supplying non-zero voltage to an electric motor of the electric boosting device at a duty cycle determined to drive the compressor at the target compressor speed. Providing the compressed air to the engine via the electric boosting device may further include fully closing or maintaining closed a bypass valve disposed within an intake passage so that intake air is directed to the compressor. Operating in the third mode may further include adjusting the cylinder intake valve and exhaust valve timing to increase the amount of positive valve overlap and rotating the engine to a position in which the intake and exhaust valves of the selected cylinder are open. As an example, the cylinder may be selected based on which cylinder(s) have already been positioned with their intake and exhaust valves open and which have not.

As a fourth example, the method may include the fourth condition occurring, determining the fourth condition based on the load of the fuel vapor storage canister and the state of charge of the system battery, selecting the fourth mode in response thereto, and operating in the fourth mode. Operating in the fourth mode may include providing the compressed air to the engine via the electric boosting device. For example, providing the compressed air to the engine via the electric boosting device may include operating the compressor of the electric boosting device at the target compressor speed, the target compressor speed determined based on operating conditions (e.g., ambient temperature and ambient humidity). Operating the compressor of the electric boosting device at the target compressor speed may include supplying non-zero voltage to the electric motor of the electric boosting device at the duty cycle determined to drive the compressor at the target compressor speed. Providing the compressed air to the engine via the electric boosting device may further include fully closing or maintaining closed the bypass valve disposed within the intake passage so that intake air is directed to the compressor. Operating in the fourth mode may further include adjusting the cylinder intake valve and exhaust valve timing to increase the amount of positive valve overlap and rotating the engine at a target speed (which may be the same as or different from the target speed while operating in the second mode) via the electric starter motor or the electric machine. The target speed may be determined based on operating conditions, such as ambient temperature and ambient humidity, for example.

Further, instructions stored on memory may include determining each of the first, the second, the third, and the fourth conditions based on an output of an exhaust gas oxygen sensor, an output of the system battery, and an output of one or more sensors of the evaporative emissions system (such as a temperature sensor coupled to the fuel vapor storage canister, a hydrocarbon sensor, etc.). In response to the first condition, instructions stored on memory may include flowing the heated gas through the selected engine cylinder by instructions for sending a first set of signals to the canister heating element, the evaporative emissions system pump, the canister purge valve, the throttle valve, cylinder intake and exhaust valve actuators or actuation systems, and the starter motor or electric machine. In response to the second condition, instructions stored on memory may include flowing the heated gas through every engine cylinder by instructions for sending a second set of signals to the canister heating element, the evaporative emissions system pump, the canister purge valve, the throttle valve, the cylinder intake and exhaust valve actuators or actuation systems, and the starter motor or electric machine. In response to the third condition, instructions stored on memory may include flowing the compressed gas through the selected engine cylinder by instructions for sending a third set of signals to the electric motor of the electric boosting device, the throttle valve, the cylinder intake and exhaust valve actuators or actuation systems, and the starter motor or electric machine. In response to the fourth condition, instructions stored on memory may include sending a fourth set of signals to the electric motor of the electric boosting device, the throttle valve, the cylinder intake and exhaust valve actuators or actuation systems, and the starter motor or electric machine.

In some examples, the method may include determining whether to perform one or more or each of flowing the heated gas and flowing the compressed gas through one or more engine cylinders based on a determination of whether the first and/or second condition is present and/or a determination of whether the third and/or fourth condition is present. Similarly, the method may include determining whether to perform one or more of each of indexing the engine or spinning the engine continuously based on a determination of whether the first and/or third condition is present and/or a determination of whether the second and/or fourth condition is present.

As another example, the methods of FIGS. 3-5 provide a method for selecting from among each of flowing a gas through one engine cylinder while the engine is at rest and flowing the gas through every engine cylinder while the engine is spinning during conditions of spark plug wet-fouling and prior to an engine start based on a first operating condition. For example, the first operating condition may be a state of charge of a system battery. Additionally or alternatively, the method may include selecting the gas from among each of a heated gas and a compressed gas based on a second operating condition. For example, the second operating condition may be a load of a fuel vapor storage canister of an evaporative emissions system. The second operating condition may additionally or alternatively include an expected amount of energy consumed by providing the heated gas relative to an expected amount of energy consumed by providing the compressed gas. The heated gas may be heated air and/or fuel vapors provided by the evaporative emissions system, and the compressed gas may be intake air pressurized by an electric boosting device. As an example, prior to a first engine start, a controller may select to flow the heated gas through the one engine cylinder while the engine is at rest, and prior to a second engine start, which is different from the first engine start based on a relative state of charge of the system battery, the controller may select to flow the heated gas through every engine cylinder while the engine is spinning. For example, the state of charge of the system battery may be less than a threshold state of charge prior to the first engine start and greater than or equal to the threshold state of charge prior to the second engine start. As another example, prior to a third engine start, which is different from the first and second engine starts based on a relative load of the fuel vapor storage canister, the controller may select to flow the compressed gas through the one engine cylinder while the engine is at rest, and prior to a fourth engine start, which is different from the first and second engine starts based on the relative load of the fuel vapor storage canister and different from the third engine start based on the relative state of charge of the system battery, the controller may select to flow the compressed gas through every engine cylinder while the engine is spinning. For example, the load of the fuel vapor storage canister may be greater than a threshold load prior to the first and second engine starts and less than or equal to the threshold load prior to the third and fourth engine starts. Additionally, the state of charge of the system battery may be less than the threshold state of charge prior to the third engine start and greater than or equal to the threshold state of charge prior to the fourth engine start.

Note that while the example method 300 of FIG. 3 illustrates selecting between drying the wet-fouled spark plugs via airflow provided by the evaporative emissions system and via airflow provided by the electric boosting device and then the example methods of FIGS. 4 and 5 illustrate selecting between indexing the engine to dry one cylinder at a time or continuously spinning the engine electrically to dry the cylinders simultaneously, in other examples, the controller may select between indexing the engine or continuously spinning the engine prior to selecting a source of the airflow, as described above. In still other examples, the controller may simultaneously select both the source of the airflow and whether to index the engine or continuously spin the engine during the spark plug drying, as also described above.

Figure 6:
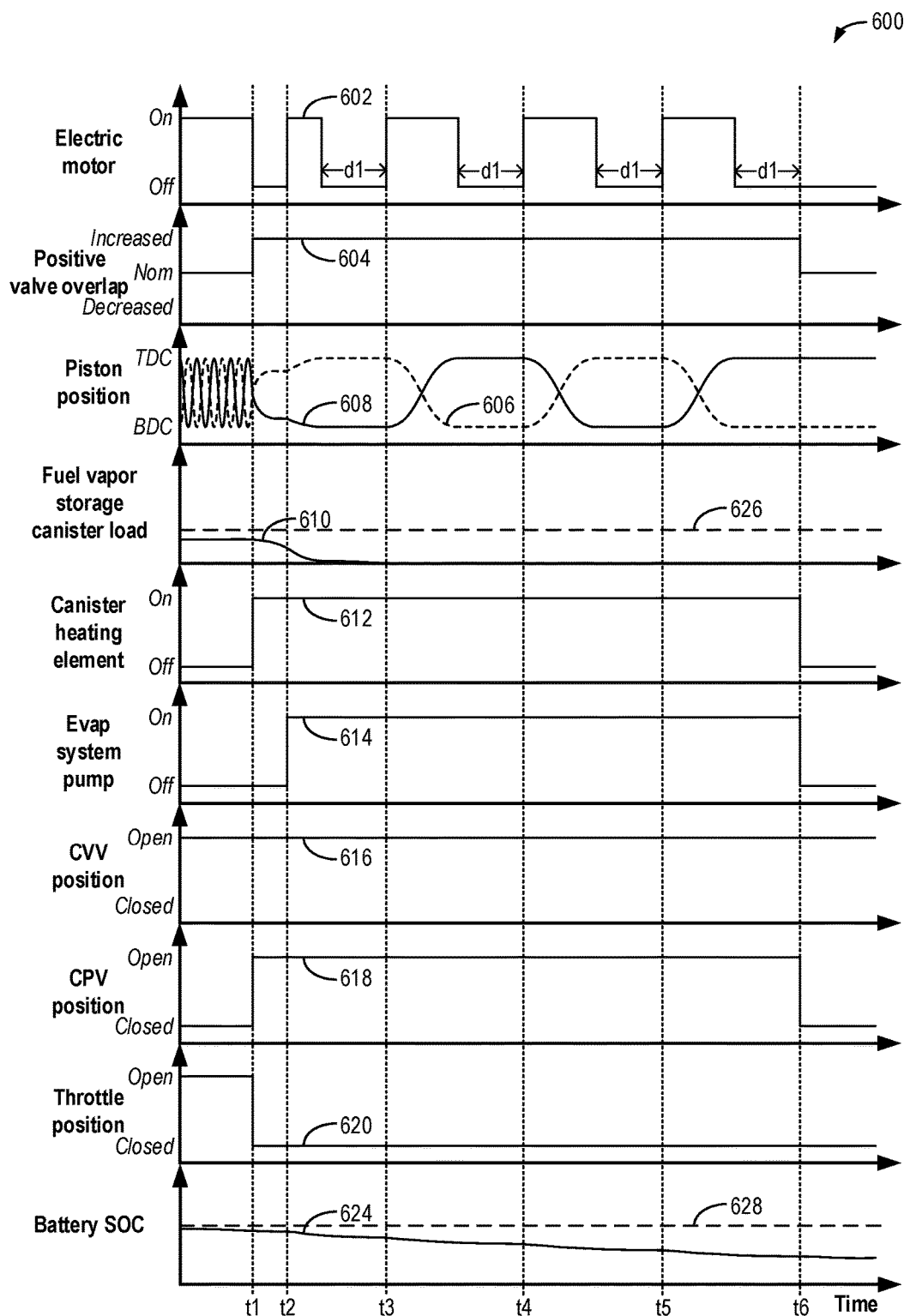
FIG. 6 depicts a prophetic example timeline for drying wet-fouled spark plugs in an engine via heated air from an evaporative emissions system on a cylinder-by-cylinder basis.

Next, FIG. 6 shows a first prophetic example timeline 600 for drying wet-fouled spark plugs while they remain in an engine via heated air provided by an evaporative emissions system (e.g., evaporative emissions system 219 of FIG. 2). For example, the wet-fouled spark plugs may be detected according to the example method of FIG. 3, and the heated air may be provided by the evaporative emissions system according to the example method shown in FIG. 4. Air may be drawn into the evaporative emissions system through a vent and an open canister vent valve (e.g., CVV 214 of FIG. 2) by a pump (e.g., pump 238 of FIG. 2). As shown in the example engine system of FIG. 2, the evaporative emissions system may include a heater, such as a canister heating element (e.g., canister heating element 216 of FIG. 2) coupled to a fuel vapor storage canister (e.g., fuel vapor storage canister 222 of FIG. 2). Both the canister heating element and the hot fuel vapor storage canister (e.g., as heated by the canister heating element) may heat the air drawn in by the pump.

An activation state of an electric motor is shown in plot 602, an amount of positive valve overlap (e.g., of cylinder intake and exhaust valves) is shown in 604, a piston position of a first set of cylinders is shown in plot 606 (dashed line), a piston position of a second cylinder set of cylinders is shown in plot 608 (solid line), a load of the fuel vapor storage canister is shown in plot 610, an activation state of the canister heating element is shown in plot 612, an activation state of the evaporative emissions system pump is shown in plot 614, a position of the CVV is shown in plot 616, a position of a CPV (e.g., CPV 212 of FIG. 2) is shown in plot 618, a position of a throttle (e.g., throttle 162 of FIGS. 1 and 2) is shown in plot 620, and a state of charge of a battery (e.g., system battery 58 of FIGS. 1 and 2) is shown in plot 624. For all of the above, the horizontal axis represents time, with time increasing along the horizontal axis from left to right. The vertical axis represents each labeled parameter. In plots 602, 612, and 614, the vertical axis represents whether the electric motor, canister heating element, and evaporative emissions system pump, respectively, are "on" (e.g., actively operating, with a non-zero voltage supplied) or "off" (e.g., deactivated and not operating, with no voltage supplied). In plot 604, the vertical axis represents an amount of increase or decrease of positive valve overlap from a nominal setting ("nom") for the given operating conditions. For plots 606 and 608, the vertical axis shows the piston position from bottom dead center ("BDC") to top dead center ("TDC"). In plots 610 and 624, the values of the fuel vapor storage canister load and the battery SOC, respectively, increase along the vertical axis from bottom to top. For plots 616, 618, and 620, the vertical axis represents a position of each valve (the CVV, CPV, and throttle, respectively) from "closed" (referring to a fully closed position of the corresponding valve) to "open" (referring to a fully open position of the corresponding valve). Furthermore, a threshold fuel vapor storage canister load is indicated by dashed line 626, and a threshold battery SOC is indicated by dashed line 628.

Prior to time t1, the electric motor is on (plot 602) to rotate a crankshaft of the engine in response to an engine start request from a vehicle operator. In one example, the electric motor is a starter motor. In another example, the electric motor is an electric machine included in a hybrid vehicle (e.g., electric machine 52 of FIG. 1). As the engine is rotated (e.g., cranked), a piston within each cylinder of the engine travels between BDC and TDC. For example, for each 360 degree rotation of the crankshaft, the piston may travel from BDC to TDC and back to TDC. The pistons of the first set of cylinders (plot 606) are 180 degrees out of phase of the second set of cylinders (plot 608) such that the pistons of the first set of cylinders are at TDC when the pistons of the first set of cylinders are at BDC (and vice versa). For example, the engine may be an inline-four cylinder engine. During the cranking, the throttle is fully open (plot 620), such as due to the vehicle operator fully depressing an accelerator pedal. As a result, the engine is flooded, and spark plug wet-fouling occurs. Due to the spark plug wet-fouling condition, the engine does not start, and the start attempt ceases at time t1 when the electric motor is deactivated (plot 602). After the electric motor is deactivated and no longer spins the engine crankshaft, the pistons may briefly continue to move due to momentum before coming to a rest between time t1 and time t2.

At time t1, in response to the spark plug wet-fouling condition (e.g., as determined based on the throttle position, an output of an exhaust gas sensor, and/or the engine not starting), a controller (e.g., controller 12 of FIGS. 1 and 2) selects between drying the spark plugs via heated air provided by the evaporative emissions system and compressed air provided by an electric boosting device based on the load of the fuel vapor storage canister and a relative energy consumption, as described with respect to FIG. 3. The fuel vapor storage canister load (plot 610) is less than the threshold fuel vapor storage canister load (dashed line 626), indicating that the spark plugs may be dried using heated air provided by the evaporative emissions system without significantly increasing vehicle emissions. Further, in the example of timeline 600, it is determined that drying the spark plugs via the evaporative emissions system will result in less energy consumption than drying the spark plugs via the electric boosting device (although in other examples, drying the spark plugs via the electric boosting device may result in less energy consumption). As a result, the canister heating element is activated (plot 612), the CVV is maintained open (plot 616), and the CPV is commanded open (plot 618) to couple the engine intake to the atmosphere via the evaporative emissions system. With the canister heating element activated, fuel vapors stored within the fuel vapor storage canister desorb from adsorbent within the fuel vapor storage canister, resulting in the fuel vapor storage canister load decreasing (plot 610). The throttle is closed (plot 620) to seal other flow paths to the engine intake. Positive valve overlap is increased, as shown in plot 604, such that a degree to which intake and exhaust valves of each cylinder are simultaneously open is maximized. Further, the battery SOC (plot 624) is less than the threshold battery SOC (dashed line 628), indicating that the battery is not sufficiently charged to dry the spark plugs while continuously rotating the engine. Thus, the spark plugs may be dried cylinder-by-cylinder by indexing the engine, which decreases the battery SOC throughout the example of timeline 600 but to a lesser extent than if the engine were continuously spun via the electric motor.

At time t2, the evaporative emissions system pump is activated (plot 614) in a positive-pressure mode such that air is drawn in through the open CVV and flows through the heated fuel vapor storage canister to the engine intake via the open CPV. Desorbed fuel vapors are also routed to the engine intake. The electric motor is activated (plot 602) to rotate the engine until the pistons of the first set of cylinders are positioned at TDC (plot 606). A first cylinder of the first set of cylinders is at the end of its exhaust stroke at TDC while a second cylinder of the first set of cylinders is at the end of its compression stroke at TDC. As such, the first cylinder of the first set of cylinders is positioned with its intake and exhaust valves open and its cylinder volume minimized while the intake and exhaust valves of the second cylinder of the first set of cylinders (as well as each of the cylinders of the second set of cylinders) remain closed. The heated air and desorbed fuel vapors flow from the engine intake and through the open first cylinder of the first set of cylinders, evaporating fuel from the wet-fouled spark plug of the first cylinder of the first set of cylinders and carrying fuel vapors (e.g., from both the fuel vapor storage canister and the wet-fouled spark plug) to the exhaust and on to an emission control device (e.g., emission control device 178 of FIGS. 1 and 2).

At time t3, a duration for drying the spark plug of the first cylinder of the first set of cylinders is met, as indicated by a duration d1 on timeline 600. Thus, the electric motor is activated (plot 602) to rotate the engine until the pistons of the second set of cylinders are positioned at TDC (plot 608). A first cylinder of the second set of cylinders is at the end of its exhaust stroke at TDC while a second cylinder of the second set of cylinders is at the end of its compression stroke at TDC. As such, the first cylinder of the second set of cylinders is positioned with its intake and exhaust valves open and its cylinder volume minimized while the intake and exhaust valves of the second cylinder of the second set of cylinders (as well as each of the cylinders of the first set of cylinders) remain closed. The heated air and any remaining desorbed fuel vapors flow from the engine intake and through the open first cylinder of the second set of cylinders, evaporating fuel from the wet-fouled spark plug of the first cylinder of the second set of cylinders and carrying fuel vapors to the emission control device.

At time t4, the duration d1 for drying the spark plug of the first cylinder of the second set of cylinders is met. The electric motor is again activated (plot 602) to rotate the engine until the pistons of the first set of cylinders are positioned at TDC (plot 606). The second cylinder of the first set of cylinders is at the end of its exhaust stroke while the first cylinder of the first set of cylinders is at the end of its compression stroke and has already been dried (e.g., between time t2 and time t3). As such, the second cylinder of the first set of cylinders is positioned with its intake and exhaust valves open and its cylinder volume minimized while the intake and exhaust valves of the first cylinder of the first set of cylinders (as well as each of the cylinders of the second set of cylinders) remain closed. The heated air flows from the evaporative emissions system to the engine intake and through the open second cylinder of the first set of cylinders, evaporating fuel from the wet-fouled spark plug of the second cylinder of the first set of cylinders and carrying fuel vapors to the emission control device.

At time t5, the duration d1 for drying the spark plug of the second cylinder of the first set of cylinders is met. The electric motor is again activated (plot 602) to rotate the engine until the pistons of the second set of cylinders are positioned at TDC (plot 608). The second cylinder of the second set of cylinders is at the end of its exhaust stroke while the first cylinder of the second set of cylinders is at the end of its compression stroke and has already been dried (e.g., between time t3 and time t4). As such, the second cylinder of the second set of cylinders is positioned with its intake and exhaust valves open and its cylinder volume minimized while the intake and exhaust valves of the first cylinder of the second set of cylinders (as well as each of the cylinders of the first set of cylinders) remain closed. The heated air flows from the evaporative emissions system to the engine intake and through the open second cylinder of the second set of cylinders, evaporating fuel from the wet-fouled spark plug of the second cylinder of the second set of cylinders and carrying fuel vapors to the emission control device.

At time t6, the duration d1 for drying the spark plug of the second cylinder of the second set of cylinders is met. Further, all four of the cylinders have been dried at time t6. As a result, the canister heating element (plot 612) and the evaporative emissions system pump (plot 614) are deactivated, such as by stopping a supply of voltage to each of the canister heating element and the evaporative emissions system pump. Further, the CPV is closed (plot 618) to isolate the engine intake from the evaporative emissions system. Additionally, the amount of positive valve overlap is decreased to the nominal setting (plot 604). With the all of the spark plugs dried, the vehicle operator may be notified that an engine start may be attempted.

Figure 7:
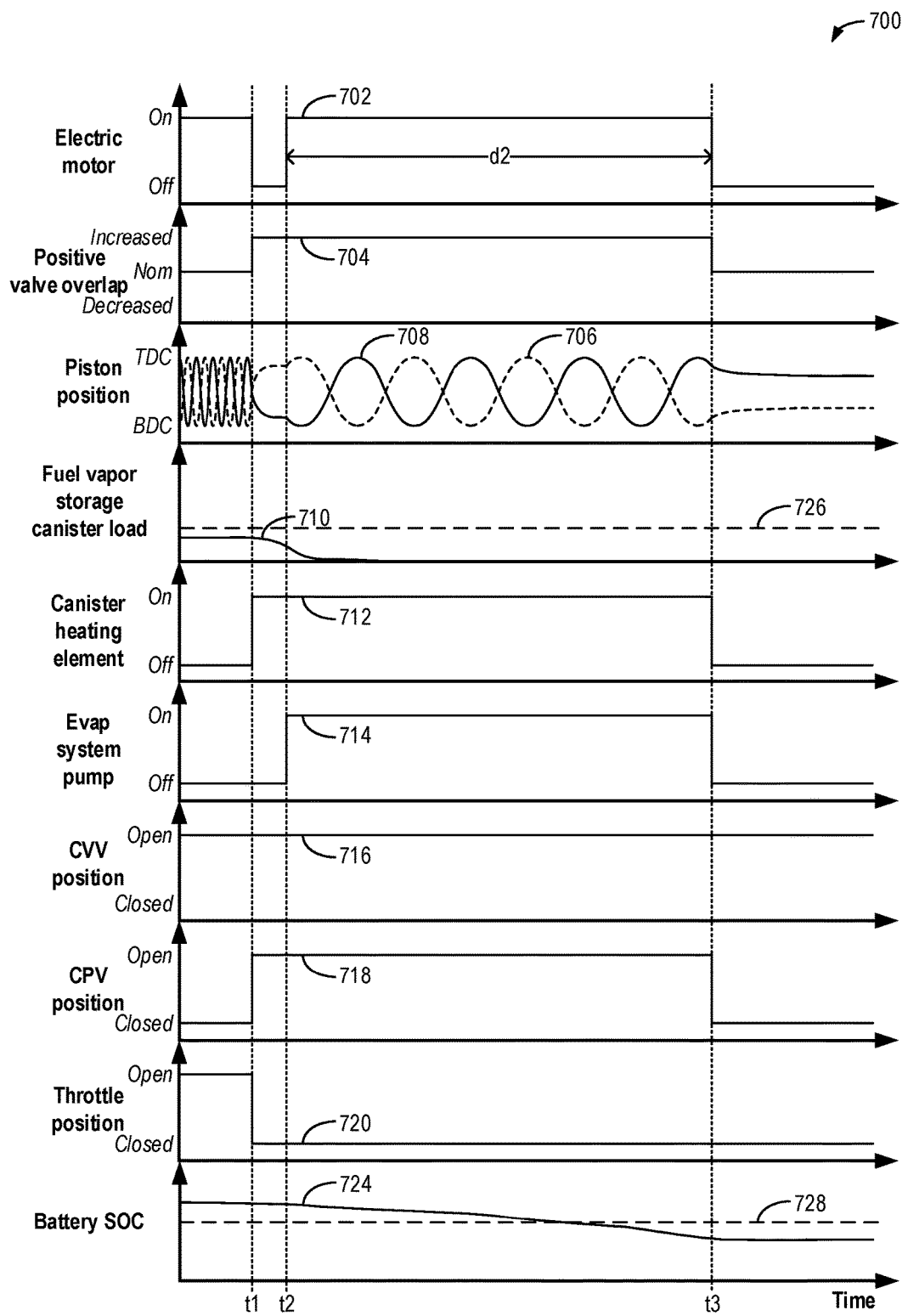
FIG. 7 depicts a prophetic example timeline for drying wet-fouled spark plugs in an engine via heated air from an evaporative emissions system while continuously spinning the engine electrically.

Next, FIG. 7 shows a second prophetic example timeline 700 for drying wet-fouled spark plugs while they remain in an engine via heated air provided by an evaporative emissions system (e.g., evaporative emissions system 219 of FIG. 2). For example, the wet-fouled spark plugs may be detected according to the example method of FIG. 3, and the heated air may be provided by the evaporative emissions system according to the example method shown in FIG. 4. Air may be drawn into the evaporative emissions system through a vent and an open canister vent valve (e.g., CVV 214 of FIG. 2) by a pump (e.g., pump 238 of FIG. 2). As shown in the example engine system of FIG. 2, the evaporative emissions system may include a heater, such as a canister heating element (e.g., canister heating element 216 of FIG. 2) coupled to a fuel vapor storage canister (e.g., fuel vapor storage canister 222 of FIG. 2). Both the canister heating element and the hot fuel vapor storage canister (e.g., as heated by the canister heating element) may heat the air draw in by the pump.

An activation state of an electric motor is shown in plot 702, an amount of positive valve overlap (e.g., of cylinder intake and exhaust valves) is shown in 704, a piston position of a first set of cylinders is shown in plot 706 (dashed line), a piston position of a second cylinder set of cylinders is shown in plot 708 (solid line), a load of the fuel vapor storage canister is shown in plot 710, an activation state of the canister heating element is shown in plot 712, an activation state of the evaporative emissions system pump is shown in plot 714, a position of the CVV is shown in plot 716, a position of a CPV (e.g., CPV 212 of FIG. 2) is shown in plot 718, a position of a throttle is shown in plot 720, and a state of charge of a battery (e.g., system battery 58 of FIGS. 1 and 2) is shown in plot 724. For all of the above, the horizontal axis represents time, with time increasing along the horizontal axis from left to right. The vertical axis represents each labeled parameter. In plots 702, 712, and 714, the vertical axis represents whether the electric motor, canister heating element, and evaporative emissions system pump, respectively are "on" (e.g., actively operating, with a non-zero voltage supplied) or "off" (e.g., deactivated and not operating, with no voltage supplied). In plot 704, the vertical axis represents an amount of increase or decrease of positive valve overlap from a nominal setting ("nom") for the given operating conditions. For plots 706 and 708, the vertical axis shows the piston position from BDC to TDC. In plots 710 and 724, the values of the fuel vapor storage canister load and the battery SOC, respectively, increase along the vertical axis from bottom to top. For plots 716, 718, and 720, the vertical axis represents a position of each valve (the CVV, CPV, and throttle, respectively) from "closed" (referring to a fully closed position of the corresponding valve) to "open" (referring to a fully open position of the corresponding valve). Furthermore, a threshold fuel vapor storage canister load is indicated by dashed line 726, and a threshold battery SOC is indicated by dashed line 728.

Prior to time t1, the electric motor is on (plot 702) to rotate a crankshaft of the engine in response to an engine start request from a vehicle operator. The electric motor may be a starter motor, for example. In another example, the starter motor may be an electric machine included in a hybrid vehicle (e.g., electric machine 52 of FIG. 1). As the engine is rotated (e.g., cranked), a piston within each cylinder of the engine travels between BDC and TDC. For example, for each 360 degree rotation of the crankshaft, the piston may travel from BDC to TDC and back to TDC. The pistons of the first set of cylinders (plot 706) are 180 degrees out of phase of the second set of cylinders (plot 708) such that the pistons of the first set of cylinders are at TDC when the pistons of the first set of cylinders are at BDC (and vice versa). For example, the engine may be an inline-four cylinder engine. During the cranking, the throttle is fully open (plot 720), such as due to the vehicle operator fully depressing an accelerator pedal. As a result, the engine is flooded, and spark plug wet-fouling occurs. Due to the spark plug wet-fouling, the engine does not start, and the start attempt ceases at time t1 when the electric motor is deactivated (plot 702). After the electric motor is deactivated and no longer spins the engine crankshaft, the pistons may briefly continue to move due to momentum before coming to a rest between time t1 and time t2.

At time t1, in response to the spark plug wet-fouling condition (e.g., as determined based on the throttle position, an output of an exhaust gas sensor, and/or the engine not starting), a controller (e.g., controller 12 of FIGS. 1 and 2) selects between drying the spark plugs via heated air provided by the evaporative emissions system and compressed air provided by an electric boosting device based on the load of the fuel vapor storage canister and a relative energy consumption, as described with respect to FIG. 3. The fuel vapor storage canister load (plot 710) is less than the threshold fuel vapor storage canister load (dashed line 726), indicating that the spark plugs may be dried using heated air provided by the evaporative emissions system without significantly increasing vehicle emissions. Further, in the example of timeline 700, it is determined that drying the spark plugs via the evaporative emissions system will result in less energy consumption than drying the spark plugs via the electric boosting device (although in other examples, drying the spark plugs via the electric boosting device may result in less energy consumption). As a result, the canister heating element is activated (plot 712), the CVV is maintained open (plot 716), and the CPV is commanded open (plot 718) to couple the engine intake to the atmosphere via the evaporative emissions system. With the canister heating element activated, fuel vapors stored within the fuel vapor storage canister desorb from adsorbent within the fuel vapor storage canister, resulting in the fuel vapor storage canister load decreasing (plot 710). The throttle is closed (plot 720) to seal other flow paths to the engine intake. Positive valve overlap is increased, as shown in plot 704, such that a degree to which intake and exhaust valves of each cylinder are simultaneously open is maximized. Further, the battery SOC (plot 724) is greater than the threshold battery SOC (dashed line 728), indicating that the battery is sufficiently charged to perform the heated air spark plug drying routine while continuously rotating the engine, which decreases the battery SOC throughout example of timeline 700 to a greater extent than if the engine were indexed to dry the spark plugs.

At time t2, the evaporative emissions system pump is activated (plot 714) in a positive-pressure mode such that air is drawn in through the open CVV and flows through the heated fuel vapor storage canister to the engine intake. Desorbed fuel vapors are also routed to the engine intake. The electric motor is activated (plot 702) to rotate the engine at a speed that is less than cranking speed (e.g., as performed prior to time t1). The speed may be determined based on operating conditions, including ambient humidity and temperature, as further described with respect to FIG. 4. As the engine is spun, the heated air (and desorbed fuel vapors) is pulled into each cylinder during its intake stroke and pushed out of each cylinder during its exhaust stroke. Further, with the increased positive valve overlap, a portion of the heated air may flow through each cylinder and to the exhaust passage while both the intake and exhaust valves of the corresponding cylinder are open. The heated air, whether contained within a cylinder during an engine cycle or flowed through, evaporates fuel from the wet-fouled spark plug coupled therein and carries the evaporated fuel to an emission control device (e.g., emission control device 178 of FIGS. 1 and 2).

At time t3, a duration for drying the wet-fouled spark plugs is met, as indicated by a duration d2 on timeline 700. Thus, the electric motor is deactivated (plot 702) so that the engine is no longer rotated. Further, the canister heating element (plot 712) and the evaporative emissions system pump (plot 714) are deactivated, such as by stopping a supply of voltage to each of the canister heating element and the evaporative emissions system pump. Further still, the CPV is fully closed (plot 718) to isolate the engine intake from the evaporative emissions system. Additionally, the amount of positive valve overlap is decreased to the nominal setting (plot 704). With all of the spark plugs dried, the vehicle operator may be notified that an engine start may be attempted.

Figure 8:
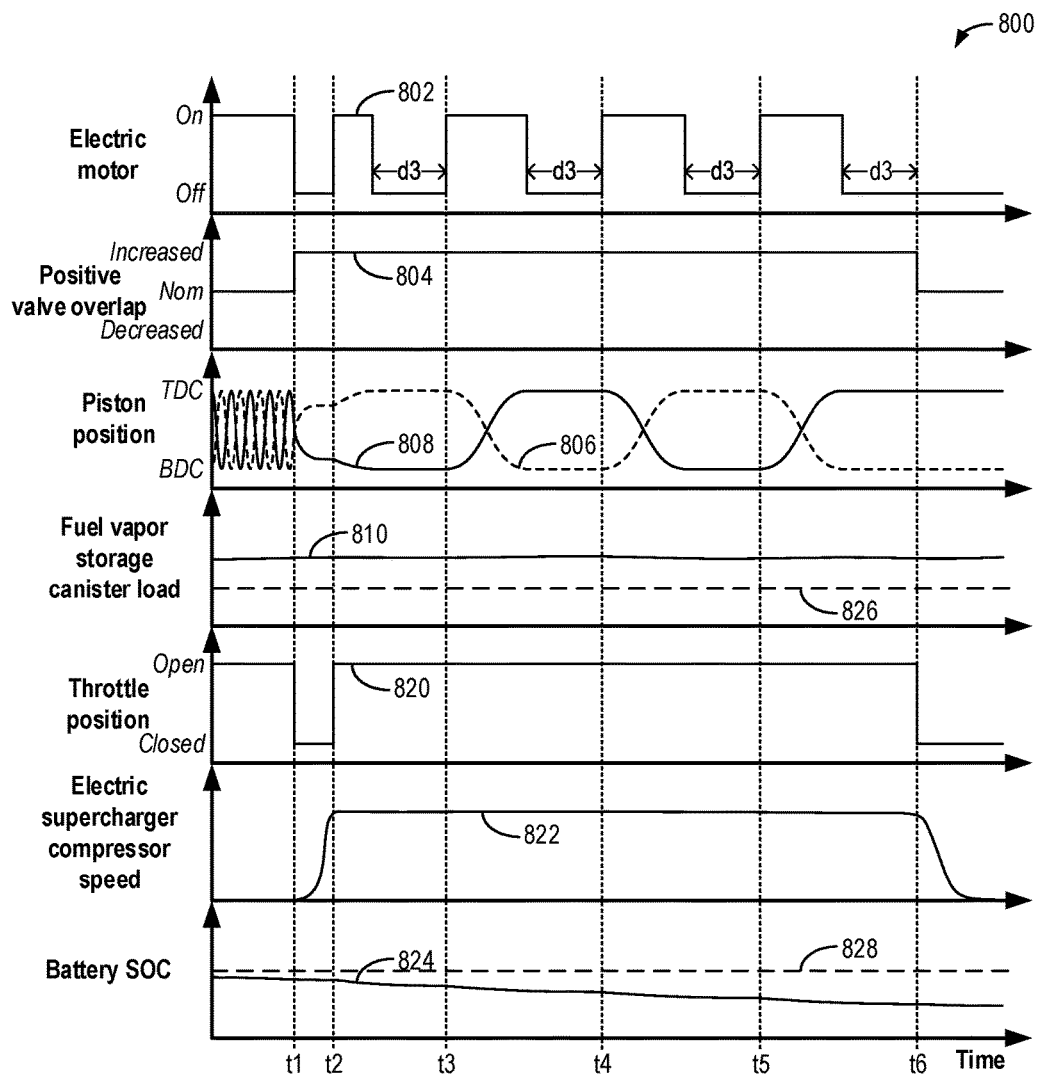
FIG. 8 depicts a prophetic example timeline for drying wet-fouled spark plugs in an engine via pressurized air from an electric boosting device on a cylinder-by-cylinder basis.

FIG. 8 shows a first prophetic example timeline 800 for drying wet-fouled spark plugs while they remain in an engine using pressurized air provided by an electric boosting device. The wet-fouled spark plugs may be detected according to the example method of FIG. 3, and the pressurized air may be provided by electric boosting device according to the example method shown in FIG. 5. For example, the engine may be included in a boosted engine system having an electric (or an electrically assisted) boosting device, such as electric supercharger 13 as shown in the example engine system of FIG. 2.

An activation state of an electric motor is shown in plot 802, an amount of positive valve overlap (e.g., of cylinder intake and exhaust valves) is shown in 804, a piston position of a first set of cylinders is shown in plot 806 (dashed line), a piston position of a second cylinder set of cylinders is shown in plot 808 (solid line), a load of a fuel vapor storage canister of an evaporative emissions system is shown in plot 810, a position of a throttle is shown in plot 820, a speed of a compressor of the electric supercharger is shown in plot 822, and a state of charge of a battery (e.g., system battery 58 of FIGS. 1 and 2) is shown in plot 824. For all of the above, the horizontal axis represents time, with time increasing along the horizontal axis from left to right. The vertical axis represents each labeled parameter. In plot 802, the vertical axis represents whether the electric motor is "on" (e.g., actively operating, with a non-zero voltage supplied) or "off" (e.g., deactivated and not operating, with zero voltage supplied). In plot 804, the vertical axis represents an amount of increase or decrease of positive valve overlap from a nominal setting ("nom") for given operating conditions. For plots 806 and 808, the vertical axis shows the piston position from bottom dead center ("BDC") to top dead center ("TDC"). In plots 810, 822, and 824, the values of the fuel vapor storage canister load, the electric supercharger compressor speed, and the battery SOC, respectively, increase along the vertical axis from bottom to top. In plot 820, the vertical axis represents the position of the throttle from "closed" (referring to a fully closed position of the throttle) to "open" (referring to a fully open position of the throttle). Furthermore, a threshold fuel vapor storage canister load is indicated by dashed line 826, and a threshold battery SOC is indicated by dashed line 828.

Prior to time t1, the electric motor is on (plot 802) to rotate a crankshaft of the engine in response to an engine start request from a vehicle operator. For example, the electric motor may be a starter motor. In another example, the electric motor may be an electric machine included in a hybrid vehicle (e.g., electric machine 52 of FIG. 1). As the engine is rotated (e.g., cranked), a piston within each cylinder of the engine travels between BDC and TDC. The pistons of the first set of cylinders (plot 806) are 180 degrees out of phase of the second set of cylinders (plot 808) such that the pistons of the first set of cylinders are at TDC when the pistons of the first set of cylinders are at BDC (and vice versa). For example, the engine may be an inline-four cylinder engine. During the cranking, the throttle is fully open (plot 820), such as due to the vehicle operator fully depressing an accelerator pedal. As a result, the engine is flooded, and spark plug wet-fouling occurs. Due to the spark plug wet-fouling, the engine does not start, and the start attempt ceases at time t1 when the electric motor is deactivated (plot 802). After the electric motor is deactivated and no longer rotates the engine crankshaft, the pistons may briefly continue to move due to momentum before coming to a rest between time t1 and time t2.

At time t1, in response to the spark plug wet-fouling condition (e.g., as determined based on the throttle position, an output of an exhaust gas sensor, and/or the engine not starting), a controller (e.g., controller 12 of FIGS. 1 and 2) selects between drying the spark plugs via heated air provided by the evaporative emissions system and compressed air provided by the electric supercharger based on the load of the fuel vapor storage canister, as described with respect to FIG. 3. The fuel vapor storage canister load (plot 810) is greater than the threshold fuel vapor storage canister load (dashed line 826), and so the controller selects to dry the wet-fouled spark plugs via compressed air provided by the electric supercharger due to the increased vehicle emissions that may result from purging the fuel vapor storage canister while the engine is off and/or due to inefficient drying with a high content of desorbed fuel vapors. As a result, the electric supercharger is activated, such as by supplying a non-zero voltage to an electric motor of the electric supercharger. The electric motor of the electric supercharger spins up the compressor of the electric supercharger (plot 822) to achieve a target compressor speed, with the target compressor speed determined based on operating conditions (as described with respect to FIG. 5). As the electric supercharger compressor spins, it draws in intake air via an intake air passage of the engine (e.g., intake passage 142 of FIGS. 1 and 2) and boosts it to a pressure that is greater than atmospheric pressure. If the supercharger compressor is included in a bypass passage coupled to the intake air passage, such as shown in the example engine system of FIG. 2, a bypass valve (e.g., ESBV 72 of FIG. 2) may be fully closed in order to direct the intake air through the electric supercharger compressor.

Additionally at time t1, positive valve overlap is increased, as shown in plot 804, such that a degree to which intake and exhaust valves of each cylinder are simultaneously open is maximized. Further, the battery SOC (plot 824) is less than the threshold battery SOC (dashed line 828), indicating that the battery is not sufficiently charged to dry the spark plugs while continuously rotating the engine. Thus, the spark plugs may be dried cylinder-by-cylinder by indexing the engine, which decreases the battery SOC throughout the example of timeline 800 but to a lesser extent than if the engine were continuously spun via the electric motor.

At time t2, in response to the electric supercharger compressor reaching the target compressor speed, the throttle is fully opened (plot 820) so that pressurized air flows from the electric supercharger, which is upstream of the throttle, to an intake manifold of the engine. The electric motor is activated (plot 802) to rotate the engine until the pistons of the first set of cylinders are positioned at TDC (plot 806). A first cylinder of the first set of cylinders is at the end of its exhaust stroke at TDC while a second cylinder of the first set of cylinders is at the end of its compression stroke at TDC. As such, the first cylinder of the first set of cylinders is positioned with its intake and exhaust valves open and its cylinder volume minimized while the intake and exhaust valves of the second cylinder of the first set of cylinders (as well as each of the cylinders of the second set of cylinders) remain closed. The compressed air flows from the electric supercharger compressor, through the engine intake manifold, and through the open first cylinder of the first set of cylinders, evaporating fuel from the wet-fouled spark plug of the first cylinder of the first set of cylinders and carrying fuel vapors to an emission control device (e.g., emission control device 178 of FIGS. 1 and 2).

At time t3, a duration for drying the spark plug of the first cylinder of the first set of cylinders is met, as indicated by a duration d3 on timeline 800. The duration d3 may be different from or may be the same as the duration d1 of timeline 600 of FIG. 6, for example. Thus, the electric motor is activated (plot 802) to rotate the engine until the pistons of the second set of cylinders are positioned at TDC (plot 808). A first cylinder of the second set of cylinders is at the end of its exhaust stroke at TDC while a second cylinder of the second set of cylinders is at the end of its compression stroke at TDC. As such, the first cylinder of the second set of cylinders is positioned with its intake and exhaust valves open and its cylinder volume minimized while the intake and exhaust valves of the second cylinder of the second set of cylinders (as well as each of the cylinders of the first set of cylinders) remain closed. The compressed air flows from the electric supercharger compressor and through the open first cylinder of the second set of cylinders, evaporating fuel from the wet-fouled spark plug of the first cylinder of the second set of cylinders and carrying fuel vapors to the emission control device.

At time t4, the duration d3 for drying the spark plug of the first cylinder of the second set of cylinders is met. The electric motor is again activated (plot 802) to rotate the engine until the pistons of the first set of cylinders are positioned at TDC (plot 806). The second cylinder of the first set of cylinders is at the end of its exhaust stroke while the first cylinder of the first set of cylinders is at the end of its compression stroke and has already been dried (e.g., between time t2 and time t3). As such, the second cylinder of the first set of cylinders is positioned with its intake and exhaust valves open and its cylinder volume minimized while the intake and exhaust valves of the first cylinder of the first set of cylinders (as well as each of the cylinders of the second set of cylinders) remain closed. The compressed air flows from the electric supercharger compressor and through the open second cylinder of the first set of cylinders, evaporating fuel from the wet-fouled spark plug of the second cylinder of the first set of cylinders and carrying fuel vapors to the emission control device.

At time t5, the duration d3 for drying the spark plug of the second cylinder of the first set of cylinders is met. The electric motor is again activated (plot 802) to rotate the engine until the pistons of the second set of cylinders are positioned at TDC (plot 808). The second cylinder of the second set of cylinders is at the end of its exhaust stroke while the first cylinder of the second set of cylinders is at the end of its compression stroke and has already been dried (e.g., between time t3 and time t4). As such, the second cylinder of the second set of cylinders is positioned with its intake and exhaust valves open and its cylinder volume minimized while the intake and exhaust valves of the first cylinder of the second set of cylinders (as well as each of the cylinders of the first set of cylinders) remain closed. The heated air flows from the evaporative emissions system to the engine intake and through the open second cylinder of the second set of cylinders, evaporating fuel from the wet-fouled spark plug of the second cylinder of the second set of cylinders and carrying fuel vapors to the exhaust.

At time t6, the duration d3 for drying the spark plug of the second cylinder of the second set of cylinders is met. Further, all four of the cylinders have been dried at time t6. As a result, the electric supercharger is deactivated, such as by stopping a supply of voltage to the electric motor of the electric supercharger. Thus, a speed of the electric supercharger compressor decreases (plot 822). Further, if the electric supercharger compressor is included in the bypass passage, the bypass valve may be opened so that intake air may flow to the intake manifold without flowing through the electric supercharger compressor. Additionally, the amount of positive valve overlap is decreased to the nominal setting (plot 804). With the all of the spark plugs dried, the vehicle operator may be notified that an engine start may be attempted.

Figure 9:
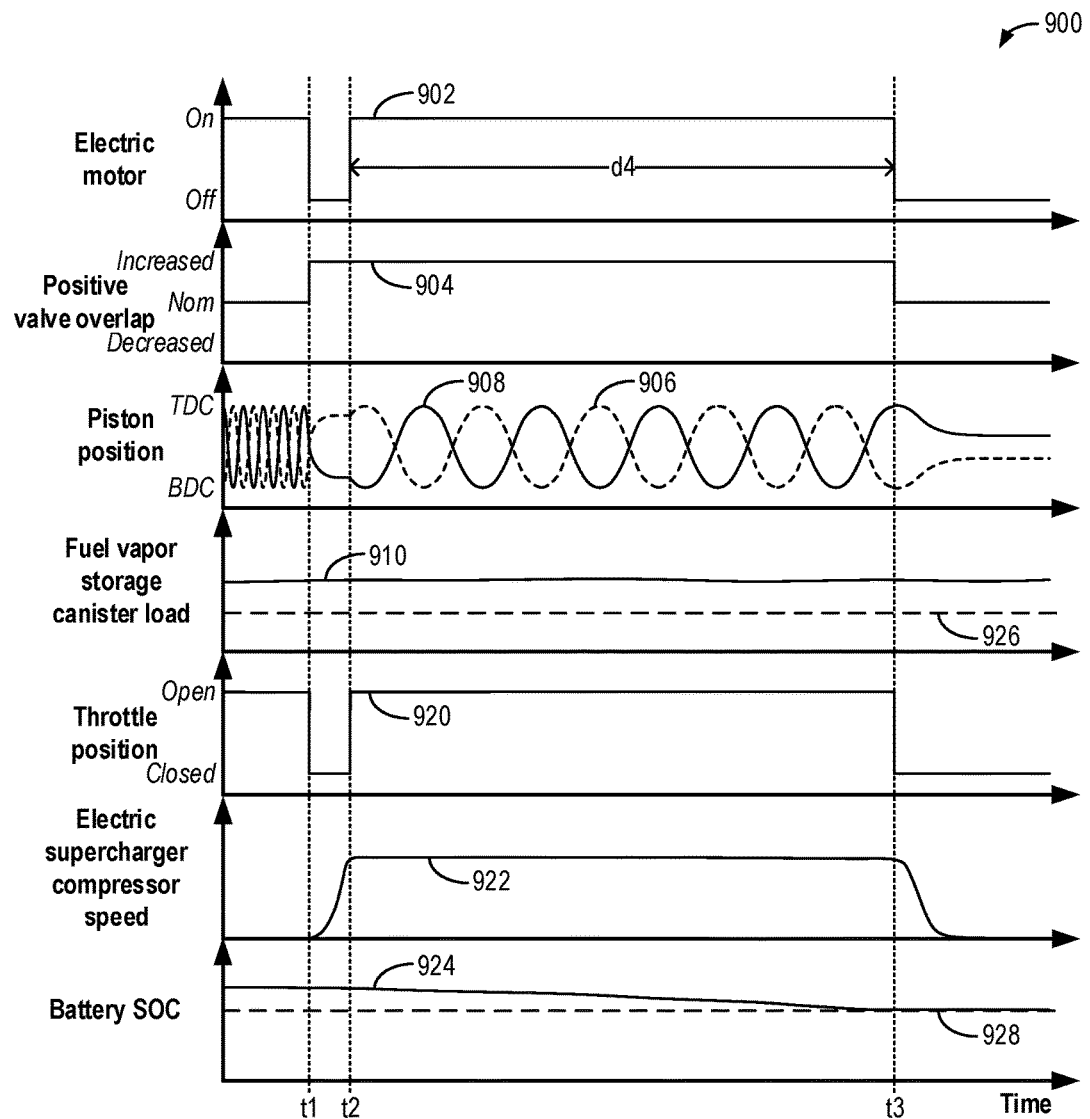
FIG. 9 depicts a prophetic example timeline for drying wet-fouled spark plugs in an engine via pressurized air from an electric boosting device while continuously spinning the engine electrically.

Next, FIG. 9 shows a second prophetic example timeline 900 for drying wet-fouled spark plugs while they remain in an engine using pressurized air provided by an electric boosting device. The wet-fouled spark plugs may be detected according to the example method of FIG. 3, and the pressurized air may be provided by electric boosting device according to the example method shown in FIG. 5. For example, the engine may be included in a boosted engine system having an electric (or an electrically assisted) boosting device, such as electric supercharger 13 as shown in the example engine system of FIG. 2.

An activation state of an electric motor is shown in plot 902, an amount of positive valve overlap (e.g., of cylinder intake and exhaust valves) is shown in 904, a piston position of a first set of cylinders is shown in plot 906 (dashed line), a piston position of a second cylinder set of cylinders is shown in plot 908 (solid line), a load of a fuel vapor storage canister of an evaporative emissions system is shown in plot 910, a position of a throttle is shown in plot 920, a speed of a compressor of the electric supercharger is shown in plot 922, and a state of charge of a battery (e.g., system battery 58 of FIGS. 1 and 2) is shown in plot 824. For all of the above, the horizontal axis represents time, with time increasing along the horizontal axis from left to right. The vertical axis represents each labeled parameter. In plot 902, the vertical axis represents whether the electric motor is "on" (e.g., actively operating, with a non-zero voltage supplied) or "off" (e.g., deactivated and not operating, with zero voltage supplied). In plot 904, the vertical axis represents an amount of increase or decrease of positive valve overlap from a nominal setting ("nom") for given operating conditions. For plots 906 and 908, the vertical axis shows the piston position from bottom dead center ("BDC") to top dead center ("TDC"). In plots 910, 922, and 924, the values of the fuel vapor storage canister load, the electric supercharger compressor speed, and the battery SOC, respectively, increase along the vertical axis from bottom to top. In plot 920, the vertical axis represents the position of the throttle from "closed" (referring to a fully closed position of the throttle) to "open" (referring to a fully open position of the throttle). Furthermore, a threshold fuel vapor storage canister load is indicated by dashed line 926, and a threshold battery SOC is indicated by dashed line 928.

Prior to time t1, the electric motor is on (plot 902) to rotate a crankshaft of the engine in response to an engine start request from a vehicle operator. For example, the electric motor may be a starter motor. In another example, the electric motor may be an electric machine included in a hybrid vehicle (e.g., electric machine 52 of FIG. 1). As the engine is rotated (e.g., cranked), a piston within each cylinder of the engine travels between BDC and TDC. The pistons of the first set of cylinders (plot 906) are 180 degrees out of phase of the second set of cylinders (plot 908) such that the pistons of the first set of cylinders are at TDC when the pistons of the first set of cylinders are at BDC (and vice versa). For example, the engine may be an inline-four cylinder engine. During the cranking, the throttle is fully open (plot 920), such as due to the vehicle operator fully depressing an accelerator pedal. As a result, the engine is flooded, and spark plug wet-fouling occurs. Due to the spark plug wet-fouling, the engine does not start, and the start attempt ceases at time t1 when the electric motor is deactivated (plot 902). After the electric motor is deactivated and no longer rotates the engine crankshaft, the pistons may briefly continue to move due to momentum before coming to a rest between time t1 and time t2.

At time t1, in response to the spark plug wet-fouling condition (e.g., as determined based on the throttle position, an output of an exhaust gas sensor, and/or the engine not starting), a controller (e.g., controller 12 of FIGS. 1 and 2) selects between drying the spark plugs via heated air provided by the evaporative emissions system and compressed air provided by the electric supercharger based on the load of the fuel vapor storage canister, as described with respect to FIG. 3. The fuel vapor storage canister load (plot 910) is greater than the threshold fuel vapor storage canister load (dashed line 926), and so the controller selects to dry the wet-fouled spark plugs via compressed air provided by the electric supercharger due to the increased vehicle emissions that may result from purging the fuel vapor storage canister while the engine is off. As a result, the electric supercharger is activated, such as by supplying a non-zero voltage to an electric motor of the electric supercharger. The electric motor of the electric supercharger spins up the compressor of the electric supercharger (plot 922) to achieve a target compressor speed, with the target compressor speed determined based on operating conditions (as described with respect to FIG. 5). As the electric supercharger compressor spins, it draws in intake air via an intake air passage of the engine (e.g., intake passage 142 of FIGS. 1 and 2) and boosts it to a pressure that is greater than atmospheric pressure. If the supercharger compressor is included in a bypass passage coupled to the intake air passage, such as shown in the example engine system of FIG. 2, a bypass valve (e.g., ESBV 72 of FIG. 2) may be fully closed in order to direct the intake air through the electric supercharger compressor.

Additionally at time t1, positive valve overlap is increased, as shown in plot 904, such that a degree to which intake and exhaust valves of each cylinder are simultaneously open is maximized. Further, the battery SOC (plot 924) is greater than the threshold battery SOC (dashed line 928), indicating that the battery is sufficiently charged to dry the spark plugs while continuously rotating the engine. Thus, the spark plugs may be dried while spinning the engine electrically, which decreases the battery SOC throughout the example of timeline 900 to a greater extent than if the cylinders were dried one at a time by indexing the engine.

At time t2, in response to the electric supercharger compressor reaching the target compressor speed, the throttle is fully opened (plot 920) so that pressurized air flows from the electric supercharger, which is upstream of the throttle, to an intake manifold of the engine. The electric motor is activated (plot 902) to rotate the engine at a speed that is less than cranking speed (e.g., as performed prior to time t1). The speed may be determined based on operating conditions, including ambient humidity and temperature, as further described with respect to FIG. 5. As the engine is spun, the compressed air is pulled into each cylinder during its intake stroke and pushed out of each cylinder during its exhaust stroke. Further, with the increased positive valve overlap, a portion of the compressed air may flow through each cylinder and to the exhaust passage while both the intake and exhaust valves of the corresponding cylinder are open. The compressed (e.g., pressurized) air, whether contained within a cylinder during an engine cycle or flowed through, evaporates fuel from the wet-fouled spark plug coupled therein and carries the evaporated fuel to an exhaust passage of the engine an on to an emission control device (e.g., emission control device 178 of FIGS. 1 and 2).

At time t3, a duration for drying the wet-fouled spark plugs is met, as indicated by a duration d4 on timeline 900. The duration d4 may be the same as or different from the duration d2 of timeline 700 of FIG. 7. Thus, the electric motor is deactivated (plot 902) so that the engine is no longer rotated. Further, the electric supercharger is deactivated, such as by stopping a supply of voltage to the electric motor of the electric supercharger. Thus, a speed of the electric supercharger compressor decreases (plot 922). If the electric supercharger compressor is included in the bypass passage, the bypass valve may be opened so that intake air may flow to the intake manifold without flowing through the electric supercharger compressor. Additionally, the amount of positive valve overlap is decreased to the nominal setting (plot 904). With the all of the spark plugs dried, the vehicle operator may be notified that an engine start may be attempted.

In this way, in response to a determination of a spark plug wet-fouling condition in an engine system, the spark plugs of one or more cylinders may be dried while they remain in the engine via on-demand airflow provided by one or more sources, the one or more sources selected based on operating conditions. Providing the on-demand airflow decreases an amount of time before the engine can be started, thereby decreasing vehicle operator frustration and an amount of battery consumed. As an example, the airflow source may be an evaporative emissions system, wherein the airflow includes a mixture of fuel vapors and fresh air that has been drawn into the evaporative emissions system by a pump and flowed through a heated fuel vapor storage canister to increase its temperature. As another example, the airflow source may be an electric boosting device, wherein the airflow includes fresh intake air that has been pressurized by the electric boosting device. A controller may select between the one or more airflow sources based on a load of the fuel vapor storage canister, for example, in order to minimize an amount of fuel vapor that is flowed to an emission control device prior to the engine start, thereby decreasing vehicle emissions. For example, the electric boosting device may be selected when the load is greater than a threshold load (or when the pump is not included in the evaporative emissions system), and the evaporative emissions system may be selected when the load is not greater than the threshold load and a relative energy consumption of providing airflow via the evaporative emissions system is expected to be lower than a relative energy consumption of providing airflow via the electric boosting device (or when the electric boosting device is not included in the engine system).

Further, the spark plugs of each cylinder may be dried sequentially, while the engine is at rest, or simultaneously, with the engine continuously rotated electrically (e.g., via a starter motor or an electric machine), in order to further decrease an amount of time before the engine can be started. The controller may select between drying the cylinders sequentially or simultaneously based on a state of charge of a system battery, for example, with drying the cylinders sequentially selected when a state of charge of the system battery is less than a threshold and drying the cylinders simultaneously selected when the state of charge is greater than the threshold. In this way, sufficient battery may remain for starting the engine and operating the vehicle after the spark plugs are dried.

The technical effect of determining spark plug wet-fouling and selecting among different on-demand airflow sources for spark plug drying is to rapidly dry the spark plugs while they remain in the engine while minimizing an amount of emissions produced by the drying.

As one example, a method comprises: in response to flooding a combustion chamber of a spark ignition engine with fuel during an engine start attempt, shutting off fuel delivery to the combustion chamber and directing compressed air from an electrically driven compressor through the combustion chamber under predetermined conditions prior to a subsequent engine start attempt. In the preceding example, additionally or optionally, the spark ignition engine includes an intake passage having a throttle coupled therein and an exhaust passage with an exhaust sensor coupled thereto, and the flooding is determined based on at least one of a position of the throttle during the engine start attempt, an output of the exhaust gas sensor during the engine start attempt, and a threshold number of engine start attempts being reached without combustion occurring in the combustion chamber. In any or all of the preceding examples, additionally or optionally, an evaporative emissions system is fluidically coupled to the intake passage, and the predetermined conditions include a load of a fuel vapor storage canister of the evaporative emissions system being greater than or equal to a threshold load. In any or all of the preceding examples, the method additionally or optionally further comprises directing heated air from the evaporative emissions system through the combustion chamber when the load of the fuel vapor storage canister is less than the threshold load. In any or all of the preceding examples, additionally or optionally, directing the compressed air through the combustion chamber comprises: adjusting valve timing of an intake and/or exhaust valve coupled to the combustion chamber to increase an amount of positive valve overlap; activating the electrically driven compressor to provide a target boost pressure determined based on one or more operating conditions; and comparing a state of charge of a system battery to a threshold state of charge. In any or all of the preceding examples, additionally or optionally, directing the compressed air through the combustion chamber further comprises: in response to the state of charge of the system battery being less than the threshold state of charge, rotating the spark ignition engine to a first engine position in which the intake and the exhaust valve coupled to the combustion chamber are held open and flowing the compressed air through the combustion chamber for a threshold duration; and after the threshold duration, rotating the spark ignition engine to a second position in which an intake and an exhaust valve coupled to a subsequent combustion chamber are held open and flowing the compressed air through the subsequent combustion chamber for the threshold duration. In any or all of the preceding examples, additionally or optionally, directing the compressed air through the combustion chamber further comprises: in response to the state of charge of the system battery being greater than or equal to the threshold state of charge, continuously spinning the spark ignition engine at a target engine speed determined based on the one or more operating conditions; and flowing the compressed air through the combustion chamber for a threshold duration. In any or all of the preceding examples, additionally or optionally, a compressor of a turbocharger is coupled to the intake passage, a turbine of the turbocharger is coupled to the exhaust passage, and the electrically driven compressor is coupled to the intake passage to provide compressed air for a predetermined duration in response to a driver demand for increased torque and a delay in supplying compressed air from the compressor of the turbocharger after the spark ignition engine is started.

As a second example, a method comprises: prior to start of an engine having multiple cylinders, each coupled to a spark-plug, and during conditions of spark plug wet-fouling, performing each of drying the spark plugs by flowing a gas through a selected one of the engine cylinders while the engine is at rest and drying the spark plugs by flowing the gas through each of the engine cylinders while the engine is spinning under different operating conditions. In the preceding example, additionally or optionally, drying the spark plugs by flowing the gas through the selected one of the engine cylinders while the engine is at rest comprises: increasing an amount of positive valve overlap between an intake valve and an exhaust valve of each of the engine cylinders; electrically rotating the engine to a position in which the intake valve and the exhaust valve of the selected one of the engine cylinders are both open and a volume within the selected one of the engine cylinders is minimized; flowing the gas from an intake of the engine, through the selected one of the engine cylinders, across the spark plug coupled therein, and to an emission control device for a threshold duration; and selecting a subsequent one of the engine cylinders after the threshold duration is reached. In any or all of the preceding examples, additionally or optionally, drying the spark plugs by flowing the gas through each of the engine cylinders while the engine is spinning comprises: increasing an amount of positive valve overlap between an intake valve and an exhaust valve of each of the engine cylinders; electrically rotating the engine for a threshold duration at a speed based on one or more operating parameters; and flowing the gas from an intake of the engine, through each of the engine cylinders, and to an emission control device for the threshold duration. In any or all of the preceding examples, additionally or optionally, the different operating conditions include a first operating condition in which a state of charge of a system battery is less than a threshold state of charge and a second operating condition in which the state of charge of the system battery is greater than or equal to the threshold state of charge. In any or all of the preceding examples, additionally or optionally, drying the spark plugs by flowing the gas through the selected one of the engine cylinders while the engine is at rest is performed during the first operating condition and drying the spark plugs by flowing the gas through each of the engine cylinders while the engine is spinning is performed during the second operating condition. In any or all of the preceding examples, additionally or optionally, the gas is heated fresh air and/or fuel vapors provided by an evaporative emissions system fluidically coupled to an intake manifold of the engine and to atmosphere. In any or all of the preceding examples, additionally or optionally, the gas is pressurized air provided by an electric boosting device coupled to an intake passage of the engine.

As a third example, a system comprises: an engine having a plurality of cylinders, each cylinder including a spark plug, an intake valve, and an exhaust valve; a variable camshaft timing (VCT) system configured to adjust a timing of the intake valve and a timing of the exhaust valve of each cylinder; an evaporative emissions system in fluidic communication with an intake of the engine via a purge line, the evaporative emissions system including a fuel vapor storage canister; a canister heating element coupled to the fuel vapor storage canister; a canister vent valve positioned in a vent of the evaporative emissions system; a canister purge valve positioned in the purge line; a pump coupled to the vent between the fuel vapor storage canister and atmosphere; a first electric motor coupled to a crankshaft of the engine receiving electrical power from a system battery; a supercharger compressor coupled to the intake of the engine and driven by a second electric motor receiving electrical power from the system battery; and a controller storing instructions in non-transitory memory that, when executed, cause the controller to: during an indication of engine flooding and prior to an engine start, actuate the VCT system to retard the timing of the exhaust valve and advance the timing of the intake valve of each cylinder; dry each cylinder one-by-one by providing a first airflow in response to a load of the fuel vapor storage canister being less than a threshold load and a state of charge of the system battery being less than a threshold state of charge; dry each cylinder simultaneously by providing the first airflow in response to the load of the fuel vapor storage canister being less than the threshold load and a state of charge of the system battery being greater than or equal to the threshold state of charge; dry each cylinder one-by-one by providing a second airflow, different from the first airflow, in response to the load of the fuel vapor storage canister being greater than or equal to the threshold load and the state of charge of the system battery being less than the threshold state of charge; and dry each cylinder simultaneously by providing the second airflow in response to the load of the fuel vapor storage canister being greater than or equal to the threshold load and a state of charge of the system battery being greater than or equal to the threshold state of charge. In any or all of the preceding examples, additionally or optionally, drying each cylinder one-by-one comprises: adjusting a position of the engine via the first electric motor to hold each of an intake valve and an exhaust valve of a selected cylinder in a respective open position; routing one of the first airflow and the second airflow through the selected cylinder while the engine is at rest; after routing the one of the first airflow and the second airflow through the selected cylinder for a threshold duration, further adjusting the engine position to hold each of an intake valve and an exhaust valve of a subsequent cylinder in a respective open position; and routing the one of the first airflow and the second airflow through the subsequent cylinder for the threshold duration. In any or all of the preceding examples, additionally or optionally, drying each cylinder simultaneously comprises: spinning the engine via the first electric motor at a target speed determined based on operating conditions; and routing one of the first airflow and the second airflow through each of the cylinders for a threshold duration. In any or all of the preceding examples, additionally or optionally, the first airflow includes heated air and/or fuel vapors, and providing the first airflow comprises: activating the canister heating element to raise a temperature of the fuel vapor storage canister; commanding the canister purge valve to a fully open position; commanding the canister vent valve to a fully open position; activating the pump to draw in fresh air from the atmosphere through the vent; and flowing air and/or fuel vapors heated by the canister heating element and/or the fuel vapor storage canister to the intake of the engine via the purge line. In any or all of the preceding examples, additionally or optionally, the second airflow includes pressurized intake air, and providing the second airflow comprises: activating the second electric motor to spin the supercharger compressor at a target speed determined based on operating conditions; and flowing the pressurized intake air from an outlet of the supercharger compressor to the intake of the engine.

In another representation, a method comprises: responsive to an indication of wet-fouled spark plugs during an engine start attempt, selecting between removing fuel from one or more of the wet-fouled spark plugs by routing a heated gas through one or more engine cylinders and by routing a compressed gas through the one or more engine cylinders. In the preceding example, additionally or alternatively, the indication of wet-fouled spark plugs is in response to at least one of a position of a throttle during the engine start attempt, an output of an exhaust gas sensor during the engine start attempt, and a threshold number of engine start attempts being reached without combustion occurring in the engine cylinders. In any or all of the preceding examples, additionally or optionally, the selecting is based on a load of a fuel vapor storage canister in an evaporative emissions system coupled to the engine. In any or all of the preceding examples, additionally or optionally, the heated gas comprises fresh air and/or fuel vapors heated by a heater of an evaporative emissions system, and removing fuel from the one or more of the wet-fouled spark plugs by routing the heated gas through the one or more engine cylinders comprises: adjusting cylinder intake and/or exhaust valve timing to increase an amount of positive valve overlap; coupling an intake of the engine to atmosphere via the evaporative emissions system; activating a pump of the evaporative emissions system to draw fresh air into the evaporative emissions system; activating the heater of the evaporative emissions system to transfer heat to the fresh air and/or fuel vapors; in response to a state of charge of a system battery being less than a threshold state of charge, rotating the engine to a first engine position in which intake and exhaust valves of a first cylinder are held open and flowing the heated gas through the first cylinder; and in response to the state of charge of the system battery being greater than or equal to the threshold state of charge, continuously spinning the engine at a target engine speed and flowing the heated gas through every engine cylinder. In any or all of the preceding examples, additionally or optionally, the target engine speed is less than cranking speed and is determined based on one or more operating conditions. In any or all of the preceding examples, the method additionally or optionally further comprises: after flowing the heated gas through the first cylinder for a threshold duration, rotating the engine to a second position in which intake and exhaust valves of a second cylinder are held open; and flowing the heated gas through the second cylinder. In any or all of the preceding examples, additionally or optionally, the compressed gas is intake air compressed by an electric boosting device coupled upstream of an intake manifold of the engine, and removing fuel from the one or more of the wet-fouled spark plugs by routing the compressed gas through the one or more engine cylinders comprises: adjusting cylinder intake and/or exhaust valve timing to increase an amount of positive valve overlap; activating the electric boosting device to provide a target boost pressure determined based on one or more operating conditions; in response to a state of charge of a system battery being less than a threshold state of charge, rotating the engine to a first engine position in which intake and exhaust valves of a first cylinder are held open and flowing the compressed gas through the first cylinder; and in response to the state of charge of the system battery being greater than or equal to the threshold state of charge, continuously spinning the engine at a target engine speed determined based on the one or more operating conditions and flowing the compressed gas through every engine cylinder. In any or all of the preceding examples, the method additionally or optionally further comprises: after flowing the compressed gas through the first cylinder for a threshold duration, rotating the engine to a second position in which intake and exhaust valves of a second cylinder are held open; and flowing the compressed gas through the second cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   in response to flooding a combustion chamber of a spark ignition engine with fuel during an engine start attempt, shutting off fuel delivery to the combustion chamber and directing compressed air from an electrically driven compressor through the combustion chamber under predetermined conditions prior to a subsequent engine start attempt.

2. The method of claim 1, wherein the spark ignition engine includes an intake passage having a throttle coupled therein and an exhaust passage with an exhaust sensor coupled thereto, and the flooding is determined based on at least one of a position of the throttle during the engine start attempt, an output of the exhaust gas sensor during the engine start attempt, and a threshold number of engine start attempts being reached without combustion occurring in the combustion chamber.

3. The method of claim 2, wherein an evaporative emissions system is fluidically coupled to the intake passage, and the predetermined conditions include a load of a fuel vapor storage canister of the evaporative emissions system being greater than or equal to a threshold load.

4. The method of claim 3, further comprising directing heated air from the evaporative emissions system through the combustion chamber when the load of the fuel vapor storage canister is less than the threshold load.

5. The method of claim 2, wherein a compressor of a turbocharger is coupled to the intake passage, a turbine of the turbocharger is coupled to the exhaust passage, and the electrically driven compressor is coupled to the intake passage to provide compressed air for a predetermined duration in response to a driver demand for increased torque and a delay in supplying compressed air from the compressor of the turbocharger after the spark ignition engine is started.

6. The method of claim 1, wherein directing the compressed air through the combustion chamber comprises:
   adjusting valve timing of an intake valve and/or an exhaust valve coupled to the combustion chamber to increase an amount of positive valve overlap;
   activating the electrically driven compressor to provide a target boost pressure determined based on one or more operating conditions; and
   comparing a state of charge of a system battery to a threshold state of charge.

7. The method of claim 6, wherein directing the compressed air through the combustion chamber further comprises:
   in response to the state of charge of the system battery being less than the threshold state of charge, rotating the spark ignition engine to a first engine position in which the intake valve and the exhaust valve coupled to the combustion chamber are held open and flowing the compressed air through the combustion chamber for a threshold duration; and
   after the threshold duration, rotating the spark ignition engine to a second position in which an intake valve and an exhaust valve coupled to a subsequent combustion chamber are held open and flowing the compressed air through the subsequent combustion chamber for the threshold duration.

8. The method of claim 6, wherein directing the compressed air through the combustion chamber further comprises:
in response to the state of charge of the system battery being greater than or equal to the threshold state of charge, continuously spinning the spark ignition engine at a target engine speed determined based on the one or more operating conditions; and
flowing the compressed air through the combustion chamber for a threshold duration.

9. A method, comprising:
prior to start of an engine having multiple cylinders, each coupled to a spark plug, and during conditions of spark plug wet-fouling, performing each of drying the spark plugs by flowing a gas through a selected one of the engine cylinders while the engine is at rest and drying the spark plugs by flowing the gas through each of the engine cylinders while the engine is spinning under different operating conditions.

10. The method of claim 9, wherein drying the spark plugs by flowing the gas through the selected one of the engine cylinders while the engine is at rest comprises:
increasing an amount of positive valve overlap between an intake valve and an exhaust valve of each of the engine cylinders;
electrically rotating the engine to a position in which the intake valve and the exhaust valve of the selected one of the engine cylinders are both open and a volume within the selected one of the engine cylinders is minimized;
flowing the gas from an intake of the engine, through the selected one of the engine cylinders, across the spark plug coupled therein, and to an emission control device for a threshold duration; and
selecting a subsequent one of the engine cylinders after the threshold duration is reached.

11. The method of claim 9, wherein drying the spark plugs by flowing the gas through each of the engine cylinders while the engine is spinning comprises:
increasing an amount of positive valve overlap between an intake valve and an exhaust valve of each of the engine cylinders;
electrically rotating the engine for a threshold duration at a speed based on one or more operating parameters; and
flowing the gas from an intake of the engine, through each of the engine cylinders, and to an emission control device for the threshold duration.

12. The method of claim 9, wherein the different operating conditions include a first operating condition in which a state of charge of a system battery is less than a threshold state of charge and a second operating condition in which the state of charge of the system battery is greater than or equal to the threshold state of charge.

13. The method of claim 12, wherein drying the spark plugs by flowing the gas through the selected one of the engine cylinders while the engine is at rest is performed during the first operating condition and drying the spark plugs by flowing the gas through each of the engine cylinders while the engine is spinning is performed during the second operating condition.

14. The method of claim 9, wherein the gas is heated fresh air and/or fuel vapors provided by an evaporative emissions system fluidically coupled to an intake manifold of the engine and to atmosphere.

15. The method of claim 9, wherein the gas is pressurized air provided by an electric boosting device coupled to an intake passage of the engine.

16. A system, comprising:
an engine having a plurality of cylinders, each cylinder including a spark plug, an intake valve, and an exhaust valve;
a variable camshaft timing (VCT) system configured to adjust a timing of the intake valve and a timing of the exhaust valve of each cylinder;
an evaporative emissions system in fluidic communication with an intake of the engine via a purge line, the evaporative emissions system including a fuel vapor storage canister;
a canister heating element coupled to the fuel vapor storage canister;
a canister vent valve positioned in a vent of the evaporative emissions system;
a canister purge valve positioned in the purge line;
a pump coupled to a vent between the fuel vapor storage canister and atmosphere;
a first electric motor coupled to a crankshaft of the engine receiving electrical power from a system battery;
a supercharger compressor coupled to the intake of the engine and driven by a second electric motor receiving electrical power from the system battery; and
a controller storing instructions in non-transitory memory that, when executed, cause the controller to:
during an indication of engine flooding and prior to an engine start,
actuate the VCT system to retard the timing of the exhaust valve and advance the timing of the intake valve of each cylinder;
dry each cylinder one-by-one by providing a first airflow in response to a load of the fuel vapor storage canister being less than a threshold load and a state of charge of the system battery being less than a threshold state of charge;
dry each cylinder simultaneously by providing the first airflow in response to the load of the fuel vapor storage canister being less than the threshold load and the state of charge of the system battery being greater than or equal to the threshold state of charge;
dry each cylinder one-by-one by providing a second airflow, different from the first airflow, in response to the load of the fuel vapor storage canister being greater than or equal to the threshold load and the state of charge of the system battery being less than the threshold state of charge; and
dry each cylinder simultaneously by providing the second airflow in response to the load of the fuel vapor storage canister being greater than or equal to the threshold load and the state of charge of the system battery being greater than or equal to the threshold state of charge.

17. The system of claim 16, wherein drying each cylinder one-by-one comprises:
adjusting a position of the engine via the first electric motor to hold each of the intake valve and the exhaust valve of a selected cylinder in a respective open position;

routing one of the first airflow and the second airflow through the selected cylinder while the engine is at rest;

after routing the one of the first airflow and the second airflow through the selected cylinder for a threshold duration, further adjusting the engine position to hold each of the intake valve and the exhaust valve of a subsequent cylinder in a respective open position; and routing the one of the first airflow and the second airflow through the subsequent cylinder for the threshold duration.

18. The system of claim 16, wherein drying each cylinder simultaneously comprises:

spinning the engine via the first electric motor at a target speed determined based on operating conditions; and routing one of the first airflow and the second airflow through each of the cylinders for a threshold duration.

19. The system of claim 16, wherein the first airflow includes heated air and/or fuel vapors, and providing the first airflow comprises:

activating the canister heating element to raise a temperature of the fuel vapor storage canister;

commanding the canister purge valve to a fully open position;

commanding the canister vent valve to a fully open position;

activating the pump to draw in fresh air from atmosphere through the vent; and flowing air and/or fuel vapors heated by the canister heating element and/or the fuel vapor storage canister to the intake of the engine via the purge line.

20. The system of claim 16, wherein the second airflow includes pressurized intake air, and providing the second airflow comprises:

activating the second electric motor to spin the supercharger compressor at a target speed determined based on operating conditions; and flowing the pressurized intake air from an outlet of the supercharger compressor to the intake of the engine.

* * * * *